United States Patent [19]

Ballentine

[11] 4,066,011
[45] Jan. 3, 1978

[54] APPARATUS FOR THAWING FROZEN FOOD

[76] Inventor: Earle W. Ballentine, 3641 Via Palomino, Palos Verdes Estates, Calif. 90275

[21] Appl. No.: 290,122

[22] Filed: Sept. 18, 1972

Related U.S. Application Data

[63] Continuation-in-part of Ser. No. 179,721, Sept. 13, 1971, abandoned, which is a continuation-in-part of Ser. No. 553,065, May 26, 1966, Pat. No. 3,604,334.

[51] Int. Cl.$^2$ ............................................. A01J 11/04
[52] U.S. Cl. ........................................ 99/467; 99/483; 126/369
[58] Field of Search ............... 99/468, 474, 475, 476, 99/483; 126/369.1; 432/172, 187, 193, 203, 221, 222, 223

[56] References Cited

U.S. PATENT DOCUMENTS

| 2,944,805 | 7/1960 | Nesbitt et al. | 432/187 X |
| 2,980,099 | 4/1961 | Klemm | 99/483 X |
| 3,066,213 | 11/1962 | Webber | 126/20 X |
| 3,494,305 | 2/1970 | Pachyn | 432/187 X |

Primary Examiner—Robert W. Jenkins
Attorney, Agent, or Firm—Ralf H. Siegemund

[57] ABSTRACT

Apparatus for thawing frozen food without cooking by producing a homogeneous mixture of steam and air with a dewpoint of 170° F or lower and a mixture temperature below 212° F, external to a thawing chamber, and forcing the steam-air mixture to flow towards the top and bottom surfaces of frozen food supported in the thawing chamber.

Apparatus for reconstituting frozen food in three distinctly different steps:

1. A hot gas heats a food chamber to the serving temperature of food. The food chamber has a multiplicity of apertures positioned in the top and bottom walls of the chamber.

2. Water is vaporized by adiabatic transformation of a portion of the sensible heat in the hot gas to the latent heat of the water vapor. The water vapor is then intermixed externally to the food chamber with the hot gas in order to produce a vapor aeriform gas which has a temperature substantially higher than its dewpoint. The vapor aeriform gas is forced into the chamber apertures in order to create turbulent jets which flow normal to the top and bottom surfaces of the frozen food positioned within the food chamber. The food is heated to the dewpoint of the vapor aeriform gas by vapor condensation primarily, thereby leaving the condensate on the food surface.

3. The food is then heated to the serving temperature by the sensible heat of the vapor aeriform gas wherein the condensate is removed by vaporization.

10 Claims, 23 Drawing Figures

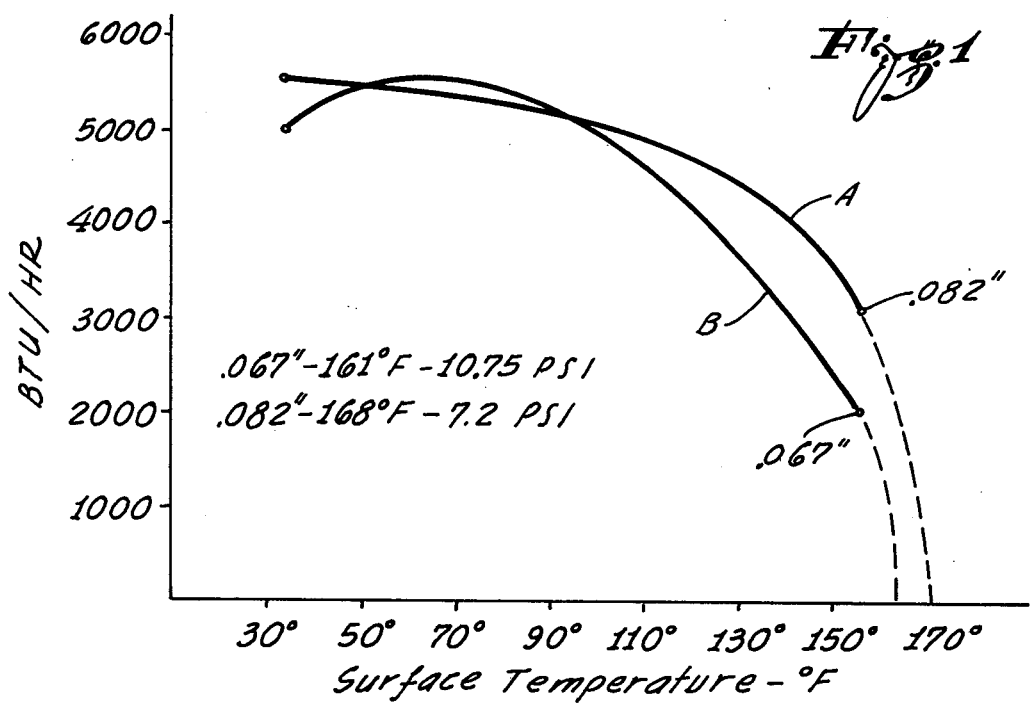
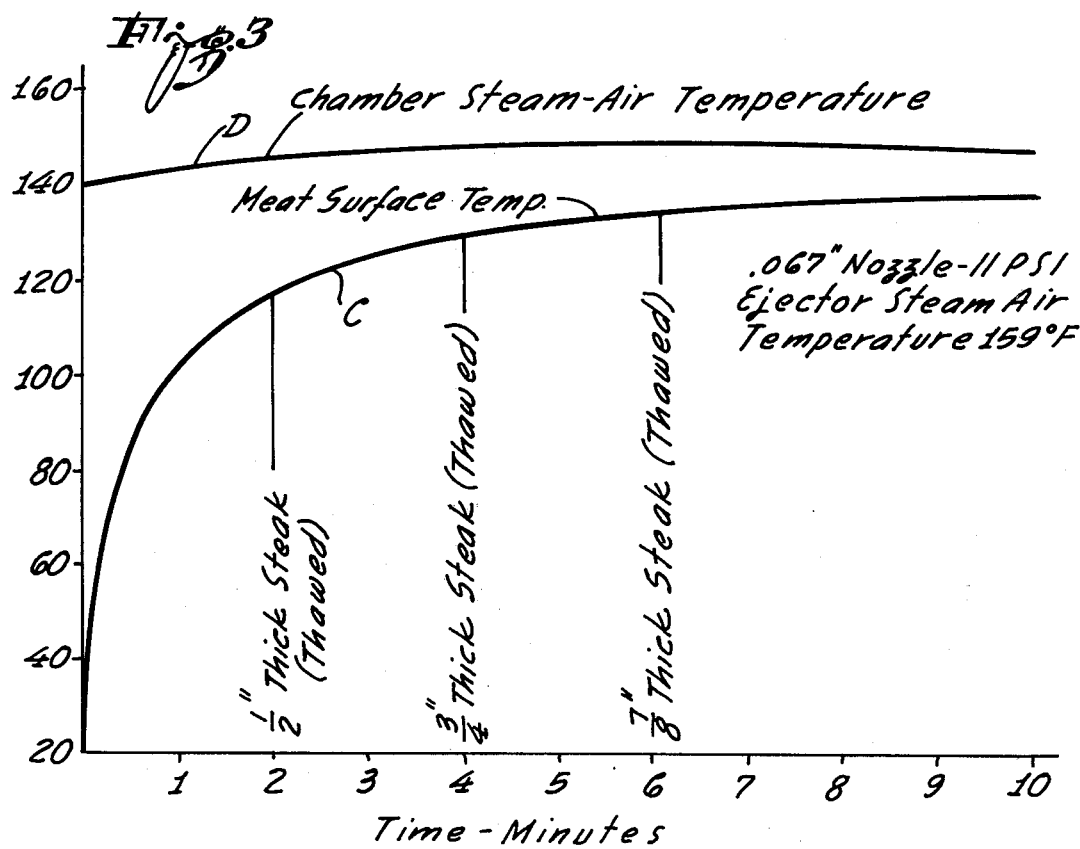

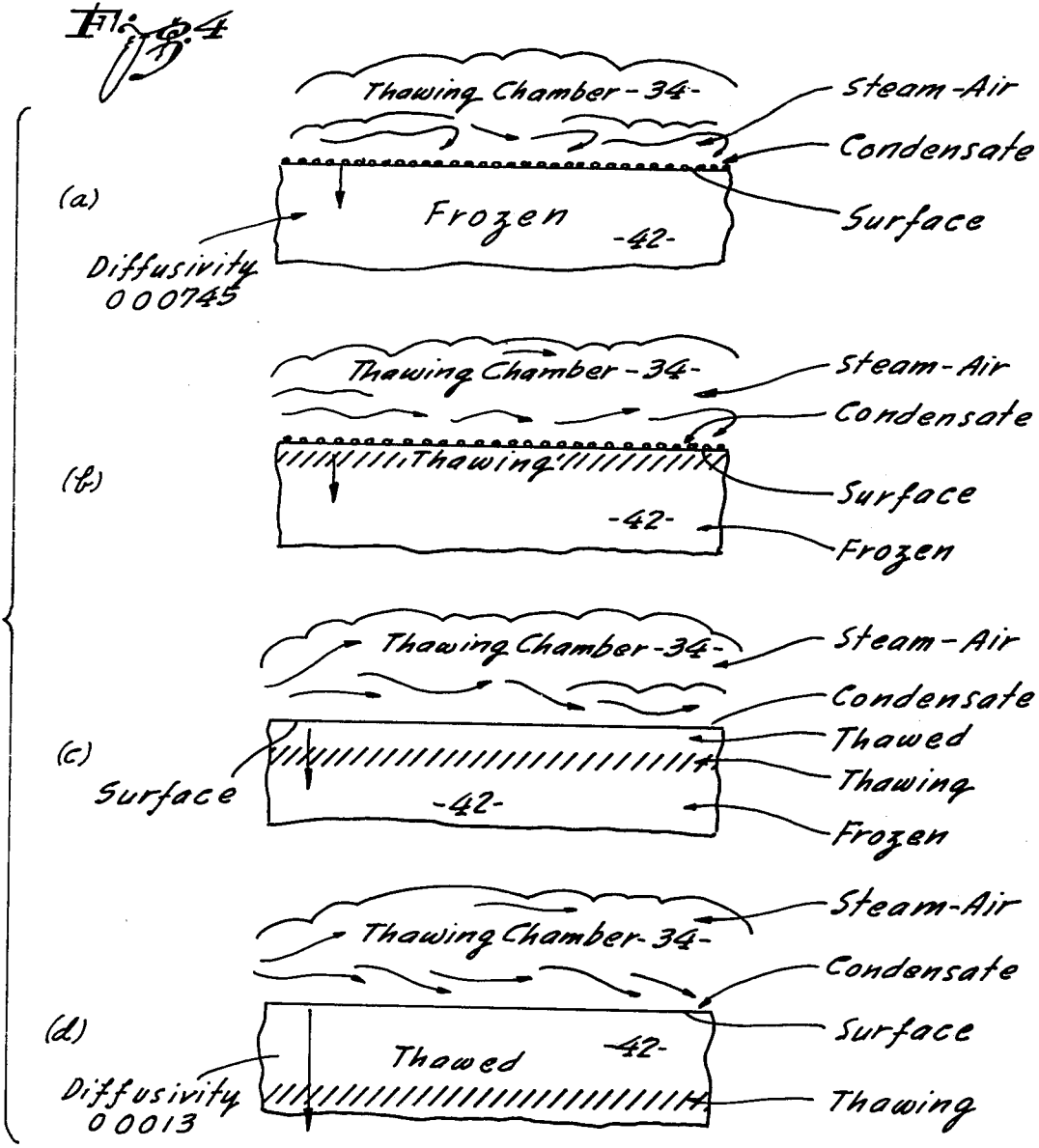

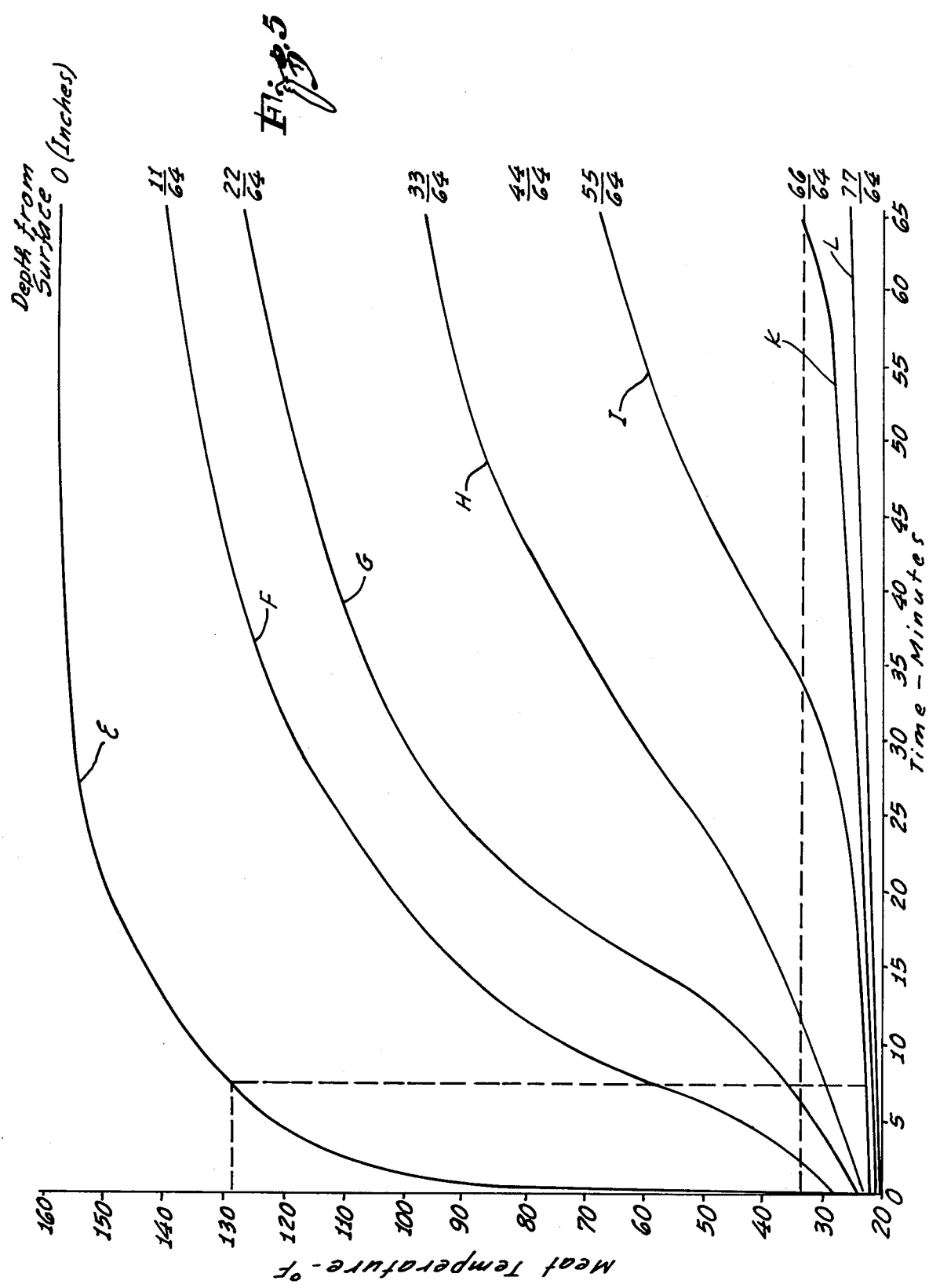

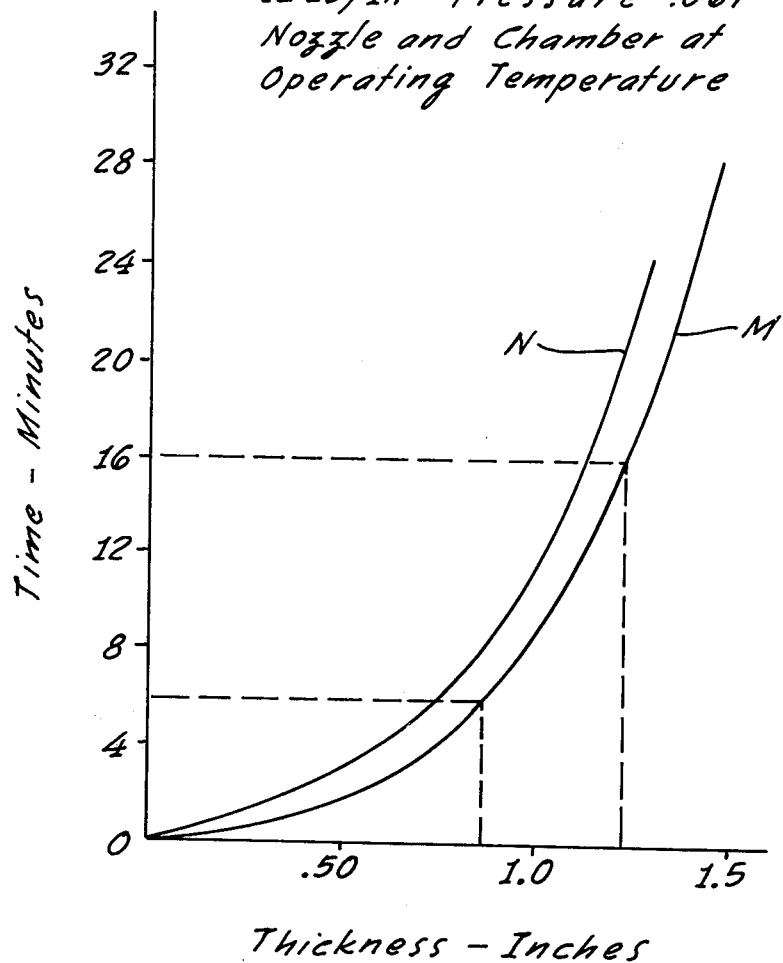

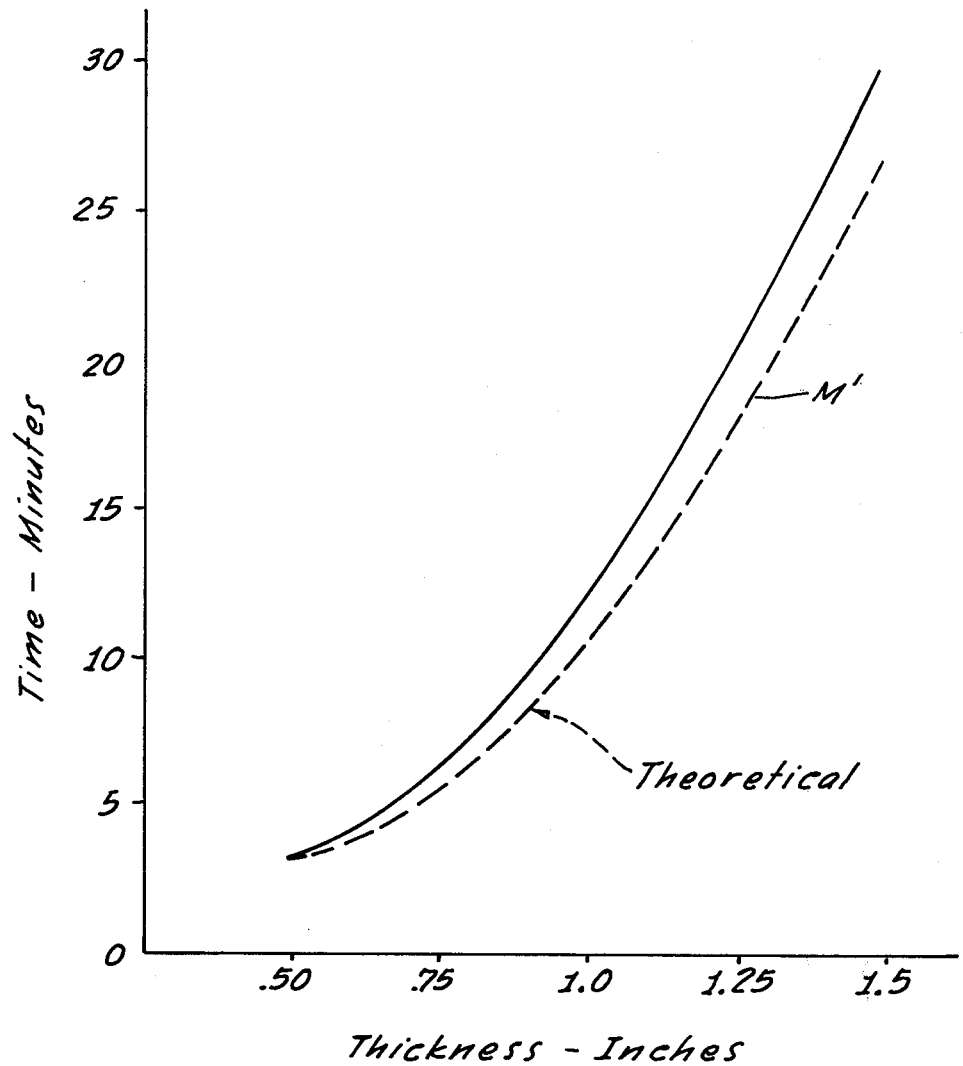

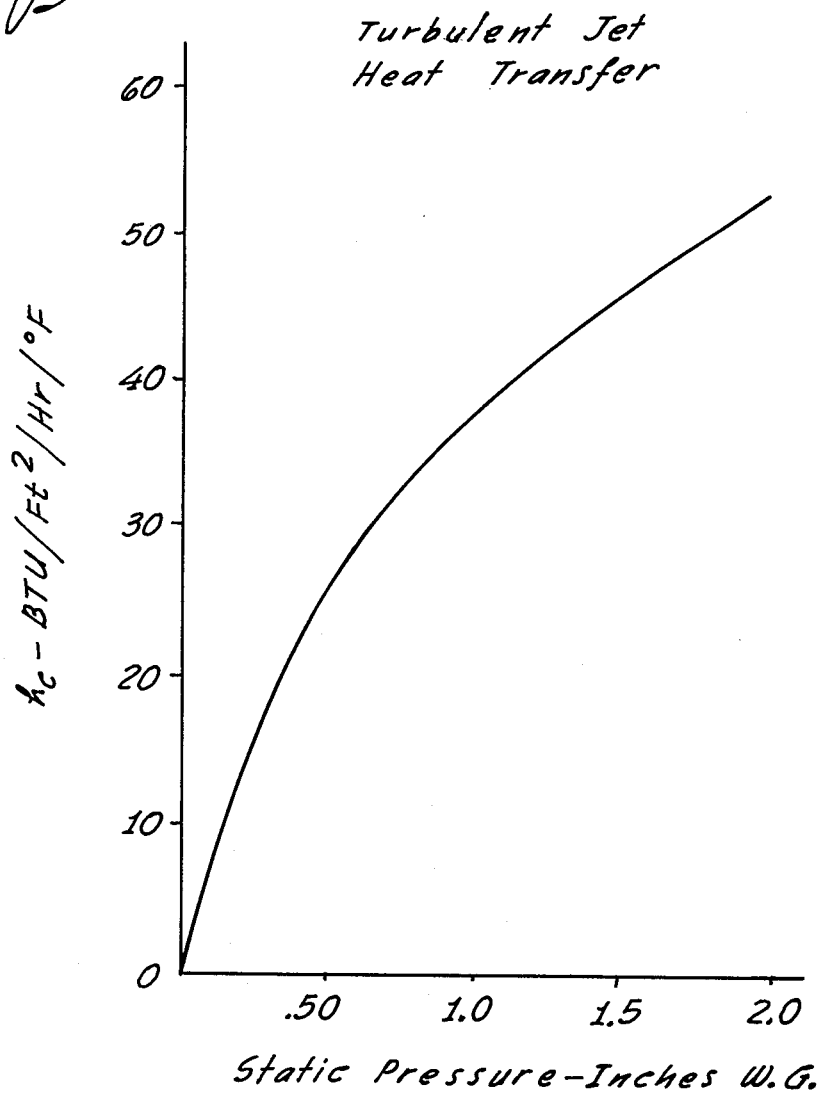

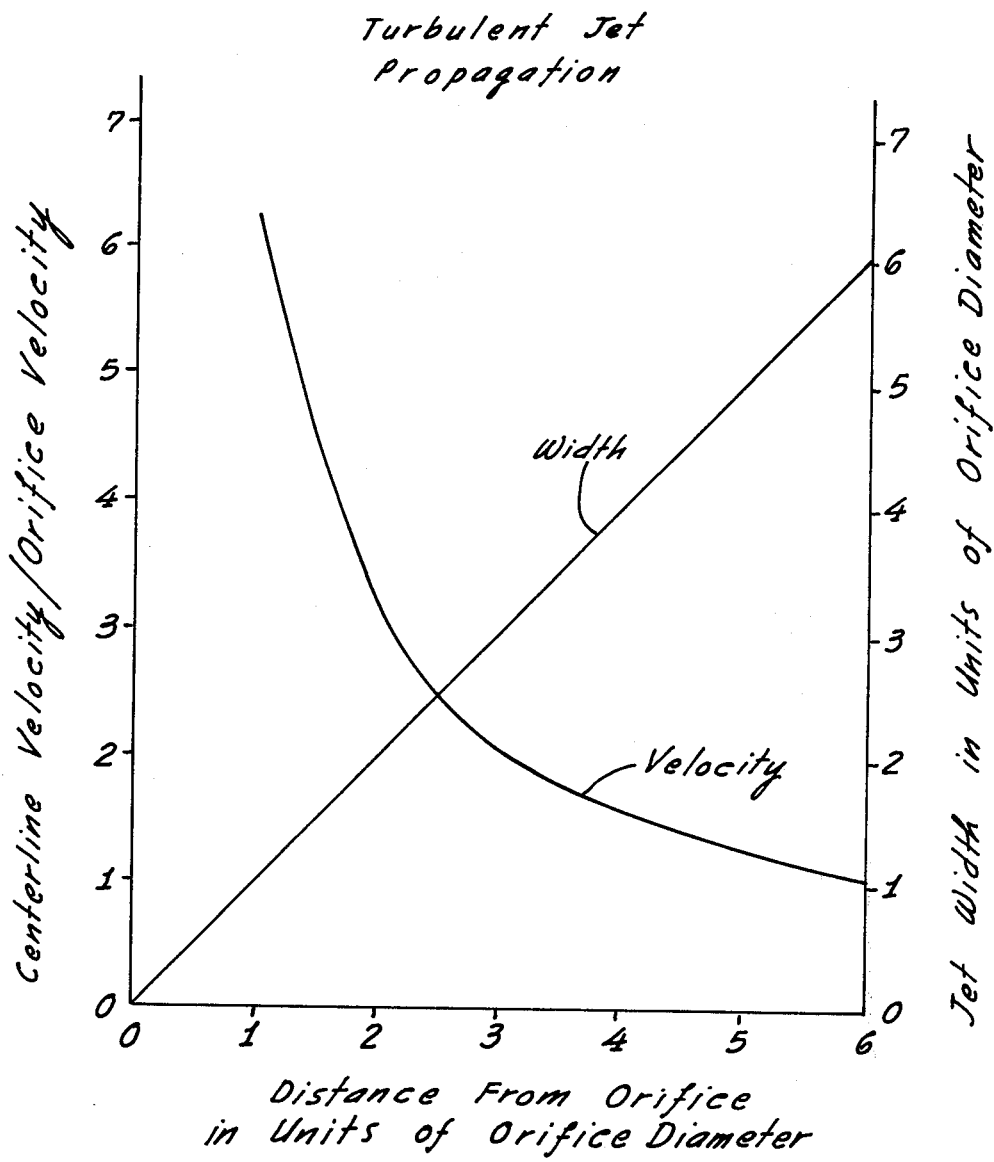

Gas Flame Adiabatic Transformation to Vapor Aeriform Gas
Nat. Gas — 100 Ft³/Hr
1050 BTU/FT³
80% Eff
450°F

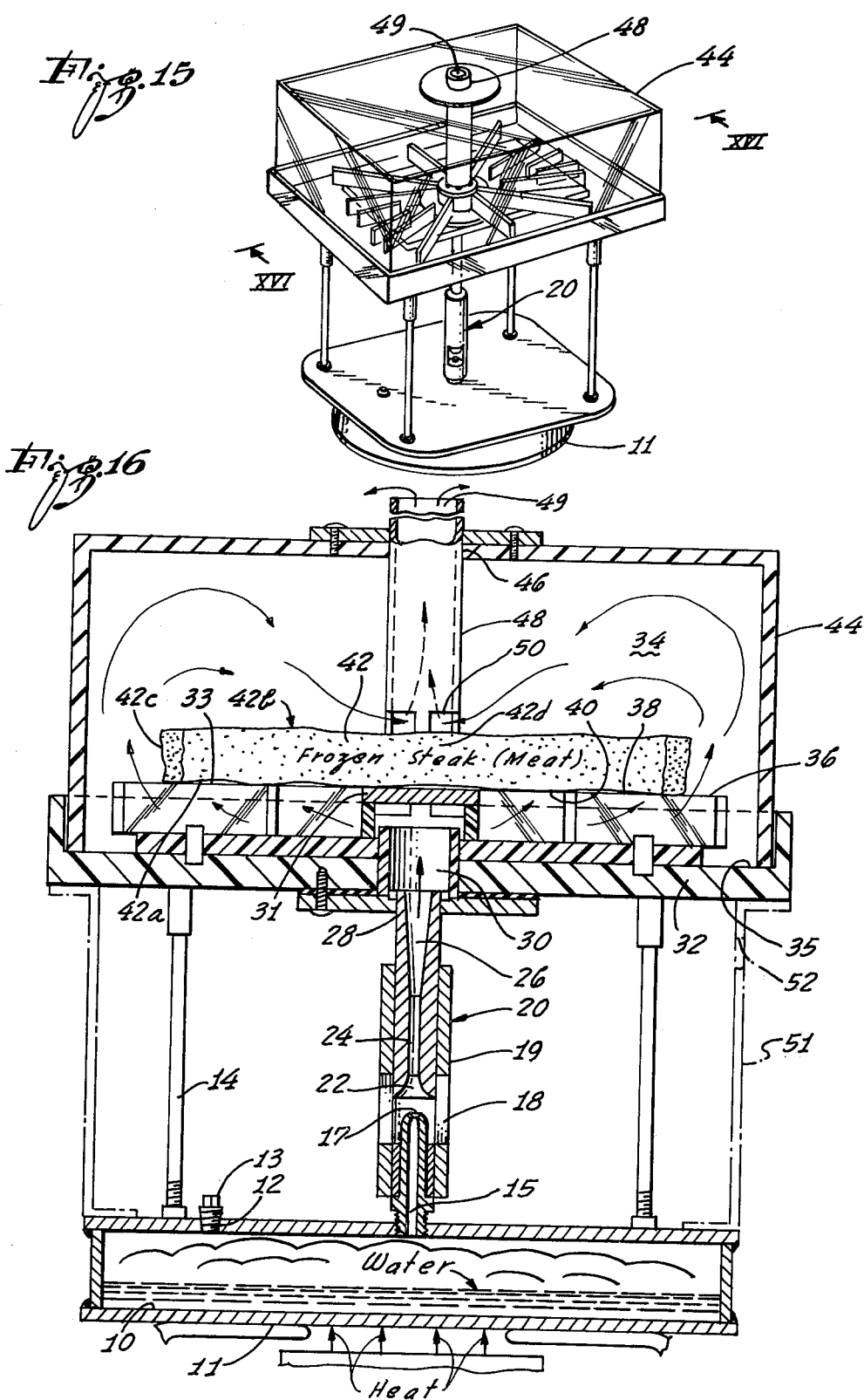

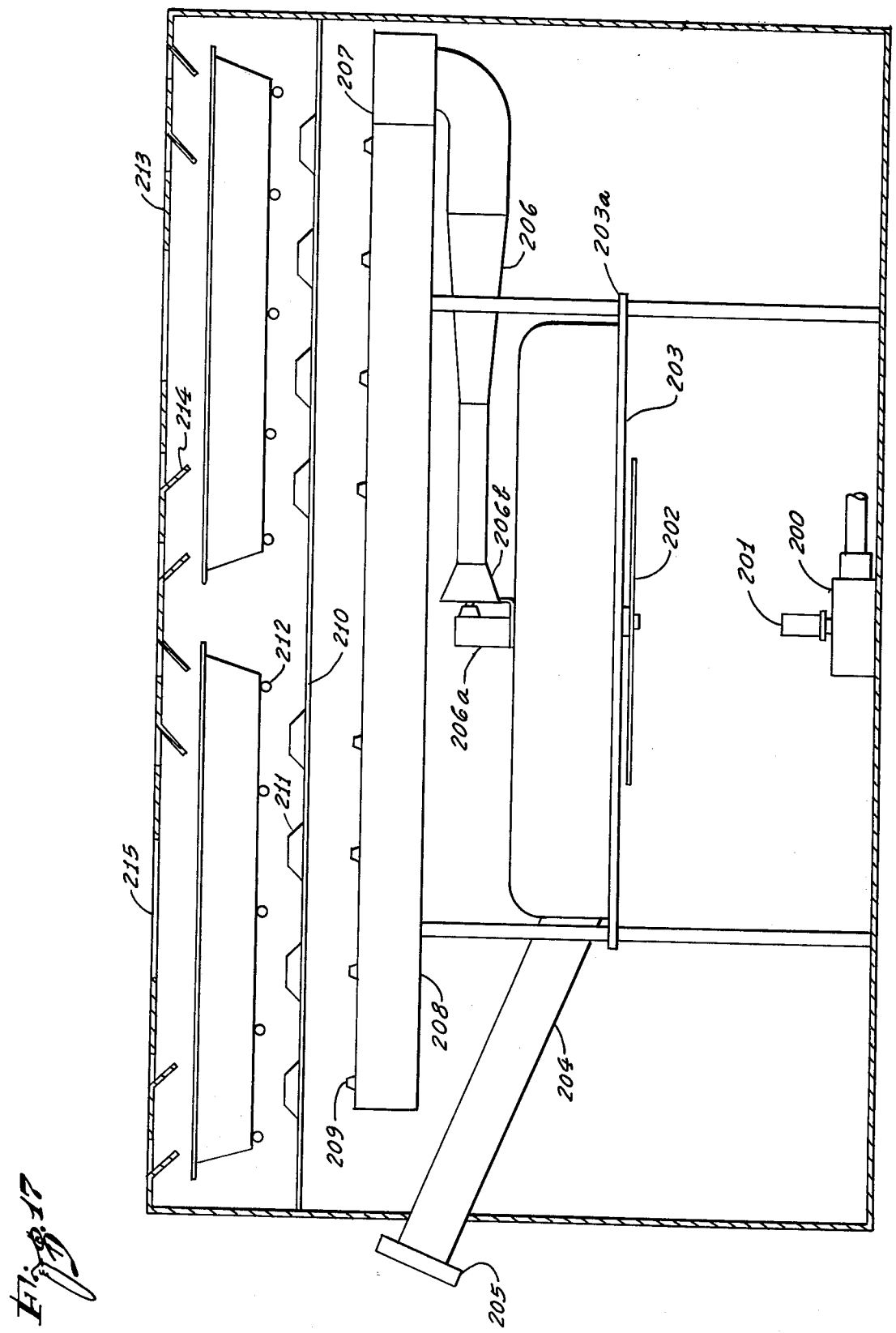

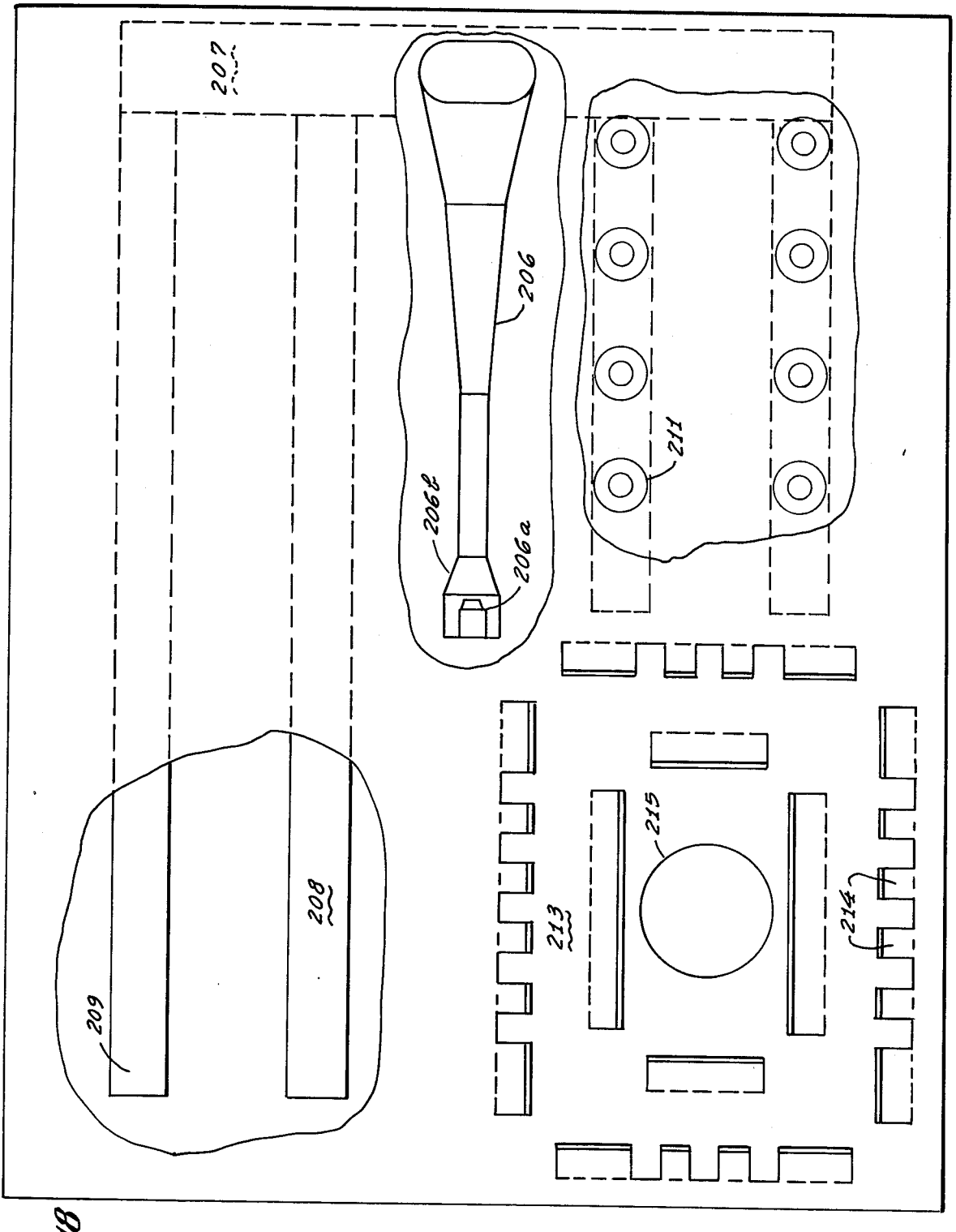

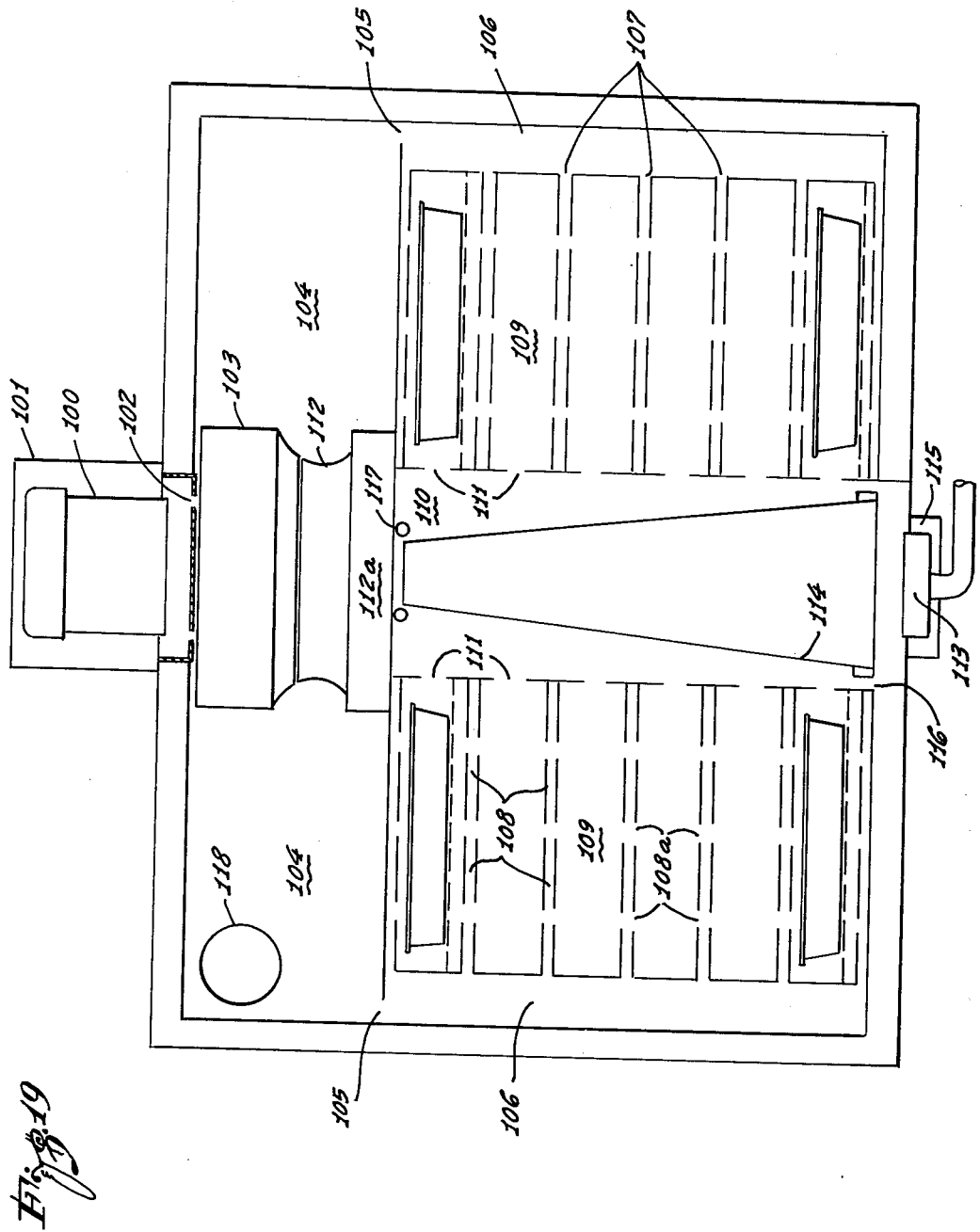

APPARATUS FOR THAWING FROZEN FOOD

This is a continuation-in-part of application Ser. No. 179,721 filed Sept. 13, 1971, now abandoned, which is a continuation-in-part of application Ser. No. 553,065 filed May 26, 1966, now U.S. Pat. No. 3,604,334, issued Sept. 14, 1971.

BACKGROUND OF THE INVENTION

The original purpose of the invention was to thaw without cooking, raw frozen protein such as meat, fish and fowl.

The salient conditions for this fast thaw process are:

1. The food should have a slab-like form with a thickness which preferably does not exceed 1⅛ inches.
2. The frozen food should be supported horizontally in a chamber with openings in the top and bottom walls of the chamber in the form of apertures, deflectors, or other guidance means for directing the flow of a gas.
3. A homogeneous saturated mixture of water vapor and air should be produced external to the chamber with a mixture temperature and dewpoint in the range of 140° to 150° F, if highest food quality is required. For maximum speed of thawing with acceptable food quality, a mixture temperature in the range of 160° to 170° F should be used.
4. The homogeneous mixture should be forced to flow turbulently through the openings in the chamber walls with components of the flow which are normal to the top and bottom surfaces of the frozen food supported in the chamber.

The apparatus of the invention is unique in that it has three forms. The first form produces the saturated mixture required for thawing without cooking frozen proteins such as steaks, chops, chicken, etc. This form employs an enclosure with at least one opening for controlling the temperature of the aeriform gases which are mixed with the steam. The position of the opening is remote from the source of the hot gases. A second form of the apparatus also employs an enclosure with an opening and the position of this opening is adjacent to the source of hot gases. The third form of the apparatus does not employ an enclosure.

The reconstitution of frozen cooked foods requires the use of either the second or third forms of the apparatus. The salient conditions for the reconstitution process require in the first place the conditions for the fast thaw process stated above with the exception of condition 3. The need for preheating the thawing chamber which is desirable in the case of the fast thaw process is mandatory for the reconstitution process.

The reconstitution of frozen food such as a TV dinner is best accomplished by using a homogeneous mixture of water vapor and an aeriform gas wherein the preferred mixture temperature has a range of 350° to 425° F and the preferred mixture dewpoint has a range of 140° to 150° F.

The new principle convective system preferably employs eight to 15 turbulent jets impinging on the top and bottom surfaces of domestic size food portions.

The speed of reconstitution is five times as fast as a domestic kitchen range oven with four TV dinners.

A first object of the invention is to thaw, without cooking, frozen proteins such as steak, chops, chicken, etc.

A second object is to reconstitute frozen prepared food.

The fundamental and unique feature of the present invention is heat transfer from a homogeneous superheated mixture which is substantially higher than the mixture dewpoint to a food when the food temperature is above the dewpoint of the gaseous mixture. The homogeneous mixture will be defined to be a vapor aeriform gas. An aeriform gas is usually air or a mixture of air with gas burner products.

A major feature of the invention is a radically new principle forced convection system which provides a serving temperature distribution throughout a homogeneous food with a temperature variance of only a few degrees.

This invention also teaches the production of a vapor aeriform gas by transforming a portion of the sensible heat of a gas flame into the latent heat of water vapor, and then mixing the gas products with the water vapor.

Another object is to reduce the loss of moisture from the food during the reconstitution process.

A further object is to prevent charring or discoloration of the food during reconstitution.

While the specification concludes with claims particularly point out and distinctly claiming the subject matter which is regarded as the invention, it is believed that the invention, its objects and features and further objects, features, and advantages thereof will be better understood from the following description, which merely illustrates exemplary preferred embodiments of structure which may be utilized to practice the invention taken in connection with the accompanying drawings, in which:

FIG. 1 illustrates two measured curves, respectively showing the development of thermal energy by condensation as a function of surface temperature and for two different mixtures of air and steam;

FIG. 3 illustrates two measured curves, both plotted as functions of temperature, one curve showing the mixing ratio of air and steam for the several temperatures, the other one showing pressure in the boiler developing the steam for the mixture;

FIGS. 4a to 4d show schematically the progress of thawing from the surface of a piece of meat into the interior thereof;

FIG. 5 shows several measured curves representing temperature as a function of time and having depths from the surface into a piece of originally frozen meat, as parameter;

FIG. 6a illustrates actual thawing time and total thawing time as a function of meat thickness, the measured curves differing by non-inclusion or inclusion of the time for preheating the exact amount of water to be evaporated for completing thawing;

FIG. 6b shows a comparison of empirical thawing time with the theoretical "law of times" which is derived from the Fourier equation;

Figure 10:
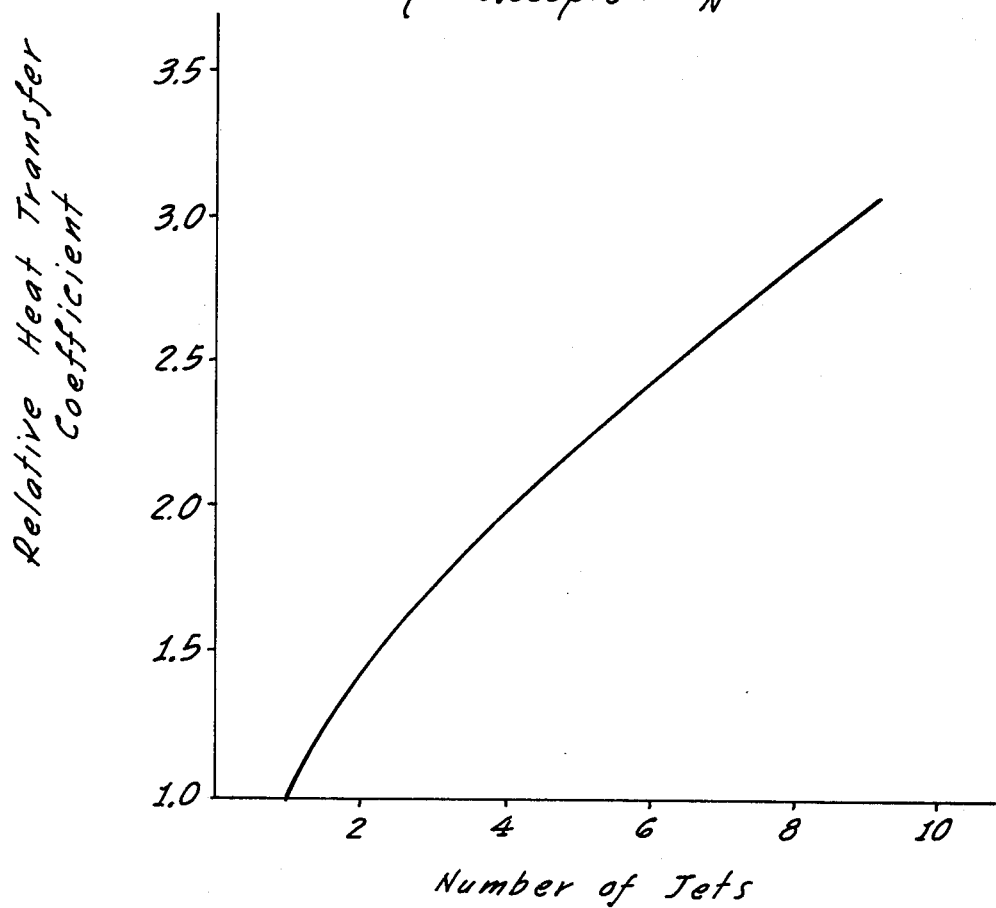
Figure 11:
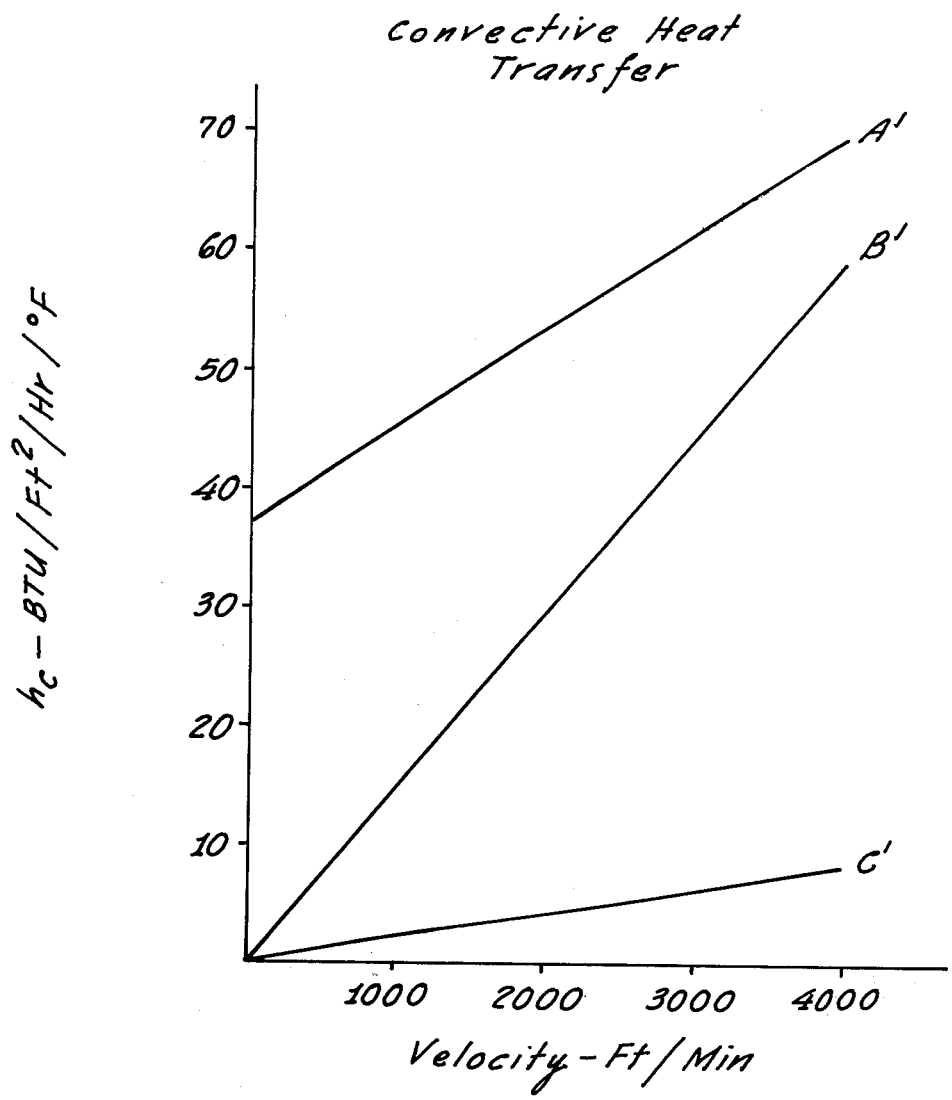
Figure 12:
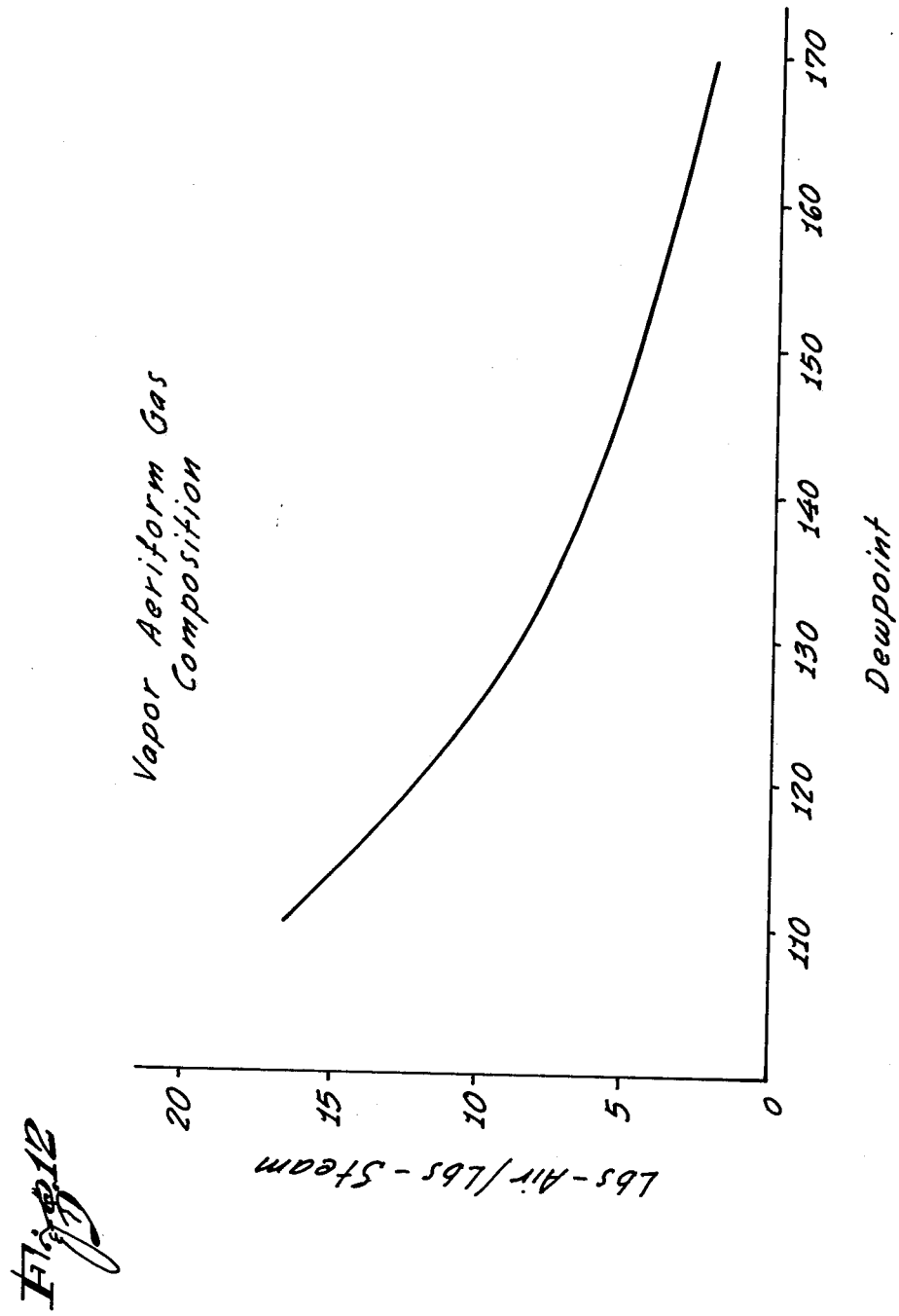
Figure 13:
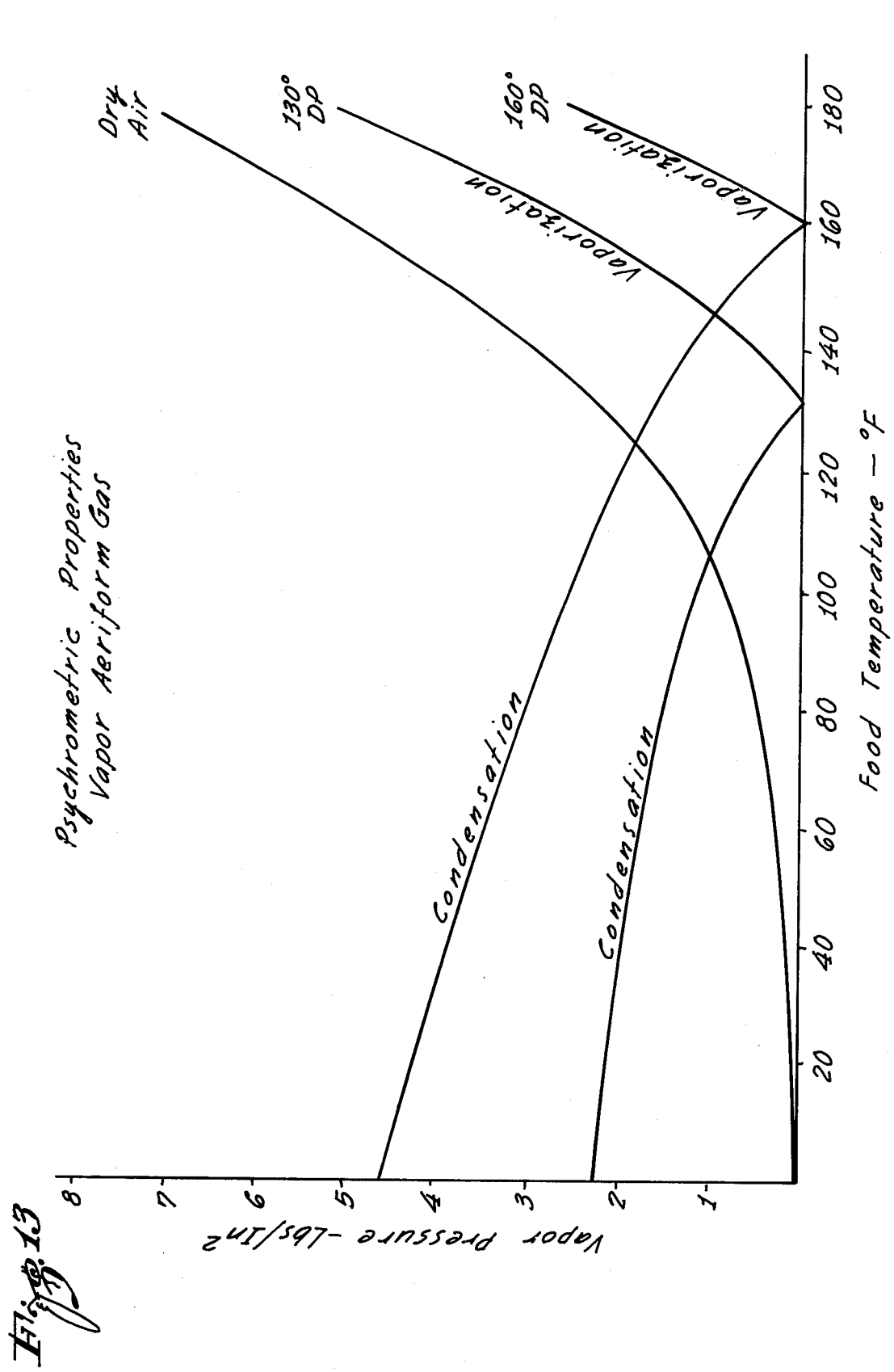
Figure 14:
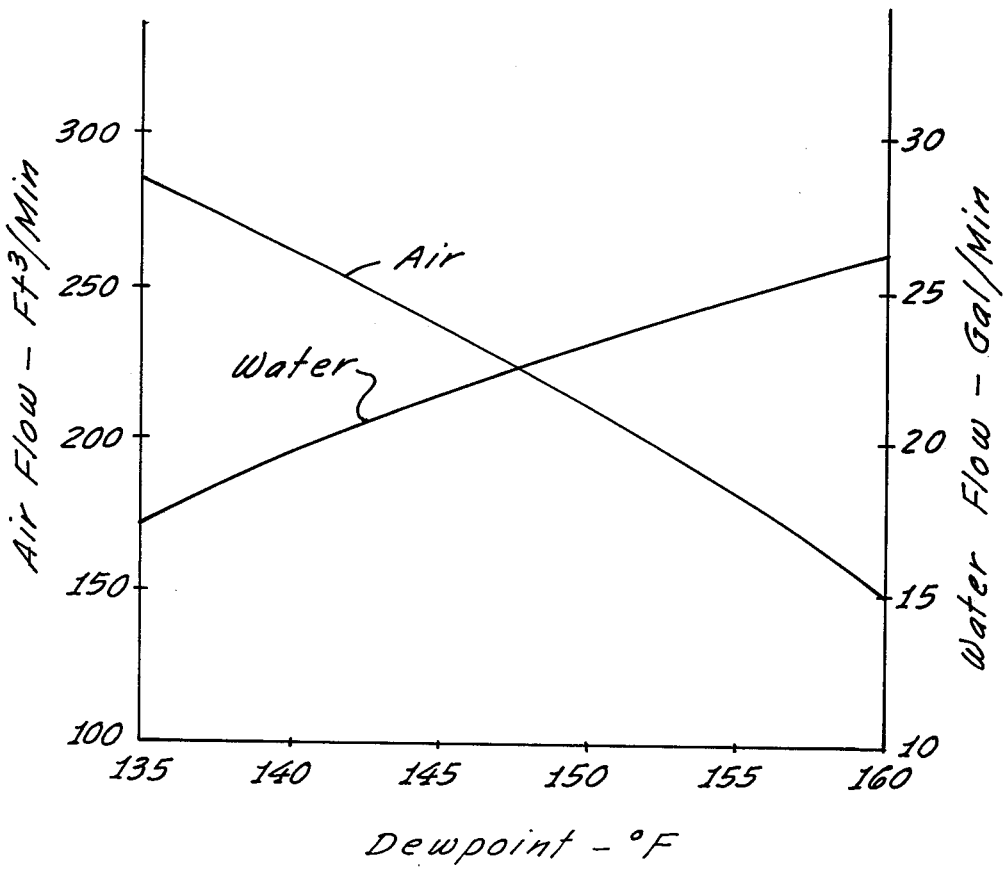

FIG. 8 displays a relation between the heat transfer coefficient of a turbulent jet and the static pressure which produces the flow;

FIG. 9 shows the center line velocity and the width of a turbulent jet as a function of the distance downstream from the jet orifice;

FIG. 10 shows the relationship between the relative heat transfer coefficient and the number of turbulent jet orifices;

FIG. 11 compares the heat transfer coefficients of a condensing vapor with those of a turbulent jet and forced convection of a permanent gas;

FIG. 12 shows a derived empirical curve which gives the dewpoint of a vapor aeriform gas as a function of its composition;

FIG. 13 presents three curves, the first of which relates to the loss of moisture by food at various temperatures in dry air, the other two derived curves relating to the gain or loss of moisture by food to vapor aeriform gases with two different dewpoints as a function of food temperature;

FIG. 14 graphically displays the conditions for adibatically transforming a gas flame into vapor aeriform gases with different temperatures and dewpoints;

FIGS. 15 and 16 illustrate fast thaw devices for home use;

FIG. 17 illustrates an elevation of the salient components of a form of apparatus for reconstituting frozen food which can be incorporated in a domestic gas range;

FIG. 18 is a top view of the apparatus illustrated in FIG. 18;

FIG. 19 illustrates the salient components of a form of apparatus for the large scale reconstitution of frozen food.

The curves plotted in the several figures will aid in the Detailed Description of my solution to the problem which is, how to apply a sufficient amount of thermal energy to a frozen piece of food without cooking it, and in a rather short period of time. From a physics standard, this problem presents itself in this manner. The frozen piece of food has a surface which is an interface of a solid body with the environment. From a point in the environment remote from this interface heat has to be supplied to a point in the interior of the piece, which has to be regarded as being also remote from the interface. Hence, one can distinguish between three phases of heat transport: (1) from the remote point in the environment (or heat source) to a point in the vicinity of the surface; (2) from that latter point into the interface or surface of the piece of food, and (3) from the latter surface region into the interior of the piece of food including the center thereof as the area remotest from the surface. The interior can be regarded as a heat sink for the thawing process itself. In the following these three phases shall be discussed in detail.

It is apparent that one has control over the last phase or process only to the extent of influencing the surface temperature. The heat conduction mechanism itself as it takes place in the interior of the piece of food is determined solely by the physical characteristics of the food. The situation is entirely different from the transport of heat through the environment (Phase 1) and into the surface of the piece of food to be thawed (Phase 2). Here now we turn to the particular condition set, namely, that the transport of heat to the surface must not provide a surface temperature at which the piece of food will cook. Accordingly, the heat supply process must be such that the temperature of meat, for example, remains below 170° F for thawing periods of, say, 15 to 20 minutes or less.

It is apparent that the heat conduction Phase 2, i.e., the supply of heat onto and into the surface of the frozen piece sets the critical operating condition; the development of thermal energy in or on the surface will determine the surface temperature of the food and the food must not cook as long as the heat transport continues. Particularly, it is essential that the entire amount of heat needed to thaw the entire piece of food be applied to the surface of meat without any cooking being accomplished. Therefore, Phase 2 shall be described first.

For this Phase 2, I have chosen to use the phenomena of condensation, as this is by far the fastest mechanism to transport heat from a point in the exterior of the surface onto the surface itself. A condensate has, at the instant immediately succeeding condensation, the same temperature the vapor had at the instant prior to condensation. The heat content of the vapor occupying a rather large volume prior to condensation, is directly and suddenly available on the surface as precipitation. The condensate occupies only a very small volume, permitting rapid transfer of the same heat content from the small amount of condensate to the cooler surface itself. Thermal energy content in a given volume of steam adjacent to the surface is thus transferred from the environment as the "speed" of the volume contraction due to the condensation onto the particular surface on which the condensate is formed. This is a heat transport resembling an implosion, and is far superior to any conduction by any kind of molecular transport mechanism of thermal energy.

The vapor to be brought into engagement ultimately determines the surface temperature of the surface of the object on which the condensate develops. The vapor, when coming into contact with the frozen piece of food should, therefore, have a temperature below a short term cooking temperature, as the surface of the food will tend to assume the temperature of the condensate.

It follows from the foregoing, that the vapor as brought into the vicinity of the food to be thawed should yield maximum possible condensation at a long term cooking temperature. This is obtained by selecting the vapor pressure so that for the particular operating temperature the vapor can be at equilibrium with the liquid phase of similar temperature. As long as the surface on which the condensate is formed is colder than the temperature, there will be immediate heat exchange between the condensate and the surface. The condensate is cooled so that the vapor contacts the liquid phase at a temperature lower than that required for equilibrium. Thus, condensation will continue as long as the surface is cooler.

Due to its high latent heat of vaporization, water vapor, i.e., steam is most suited. For operating temperatures as envisioned here, 140° to 170° F, the water vapor pressure is below atmospheric pressure for equilibrium conditions with the liquid phase. However, the thawing process cannot be carried out in a below atmospheric pressure environment because of venting requirements and because flow of steam is needed to replenish the precipitated vapor. Thus, the steam must be mixed with a gas.

A steam-air mixture having a temperature such that the steam, at its partial pressure, is in equilibrium with water of like temperature, is a steam saturated mixture. The mixture of air and steam used thus has a dewpoint which constitutes the operating temperature. The dewpoint is a very unique temperature in the case of a saturated mixture of steam and air. When frozen food is thawed by a saturated steam-air mixture, the temperature of the food will rise rapidly until it reaches a value which is about 10° to 15° F below the dewpoint. FIG. 1 shows that the transport of heat from the steam mixture to the food is more or less constant until the food reaches a temperature of about 155° F when the steam-air mixture has a dewpoint of 168° F. The food temperature cannot exceed the dewpoint, of course, because the temperature gradient between the steam-air mixture and the food would be zero. This unique property of a saturated steam-air mixture makes is possible to thaw frozen uncooked food without cooking by choosing a dewpoint which is below the cooking temperature for the particular food. (Saturated mixtures with a temperature and dewpoint above the boiling point of water are used for fast thawing of frozen cooked vegetables in commercial kitchens.) There is one disadvantage of the saturated mixture, namely, its low temperature.

The transport of heat from a steam-air mixture to the frozen food depends on the difference in temperature between the steam-air mixture and the frozen food. The temperatures which do not cook food are relatively low and the rate of transport of heat from the steam-air mixture to the frozen food is correspondingly slow. For this reason, a compromise must be effected in choosing the dewpoint, which means that the temperature of the steam-air mixture must be as high as possible as determined by the appearance of the food after thawing. By using a higher dewpoint the transport of heat increases in two ways, namely, the larger steam-air to food temperature gradient and the larger amount of latent heat released when the water vapor in the mixture condenses on the food. It is of interest to consider the magnitude of the amount of latent heat in two saturated steam-air mixtures with dewpoints of 140° and 160° F. The dewpoint is determined by the vapor pressure of water at the dewpoint which, in the case of a saturated mixture, is the mixture temperature and the molecular weight of the permanent gas, which in this case is air. The well-known steam tables show that water at 140° F has a vapor pressure of about 2.9 lbs/in$^2$. This pressure is, therefore, Dalton's partial vapor pressure of the water vapor. The partial pressure of air is, of course, the difference between the atmospheric pressure of 14.7 lbs/in$^2$ and the partial water vapor pressure of 2.9 lbs/in$^2$, namely, 11.8 lbs/in$^2$. The molecular weights of air and water vapor are 29 and 18, respectively. The composition of the steam-air mixture is obtained by multiplying the ratio of the partial pressures by the ratio of the molecular weight ratios, i.e., $(11.8/2.9) \times (29/18) = 6.5$ lbs. of air per lb. of steam.

Figure 2:
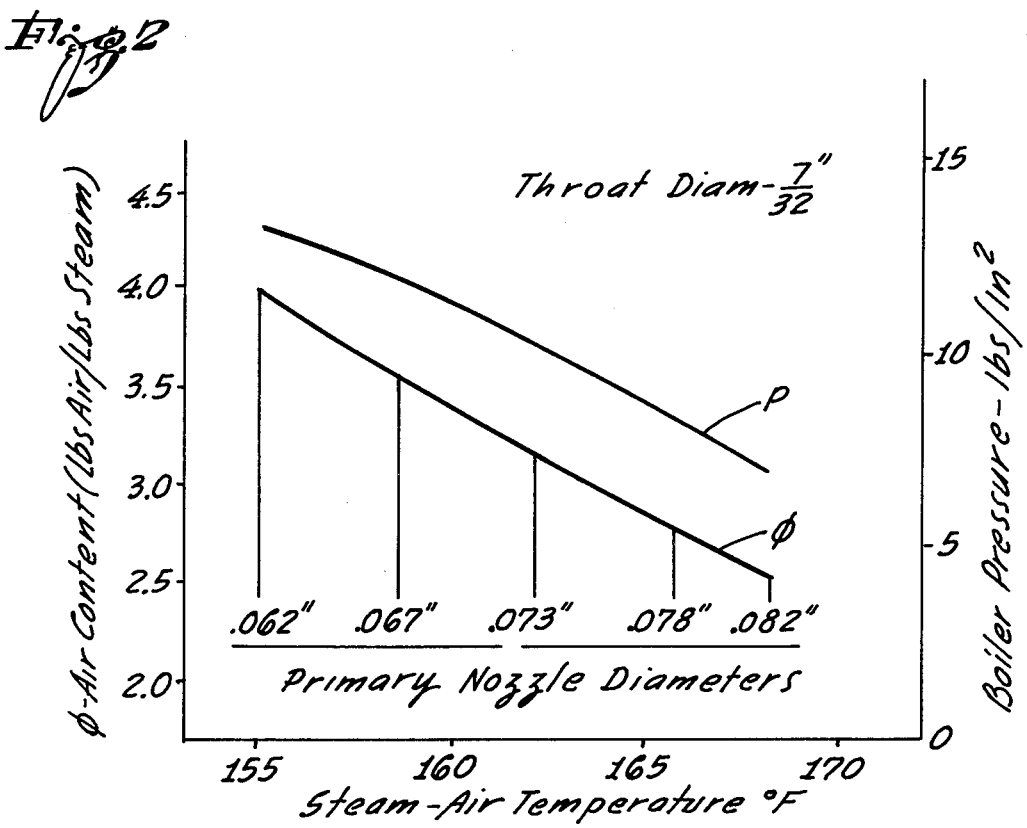
FIG. 2 illustrates, as a function of time, the surface temperature and the chamber of temperature as measured when the thawing chamber is charged with an air-steam mixture having 159° F prior to injection into the thawing chamber.

FIG. 2 gives the composition of steam-air mixture for dewpoints of 155° to 168° F and FIG. 12 gives the composition of steam-air mixtures for dewpoints of 110° to 170° F. In order to determine the amount of latent heat in the two steam-air mixtures, it is necessary to know the value of the latent heat of steam. Since the latent heat of steam depends on its pressure we will assume a latent heat of 1000 BTU/lb. Thus, steam-air mixture having a weight of 7.5 lbs. has a latent heat of 1000 BTU, which means that one pound of the steam-air mixture has a latent heat of $1000/7.5 = 133$ BTU/lb. The vapor pressure of water at a temperature of 160° F is 4.7 lbs/in$^2$ so that the composition of a steam-air mixture with a dewpoint of 160° F is 4.8 lbs. of air to 1.0 lbs. of steam. Thus, the 160° F dewpoint has a latent heat of 208 BTU/lb. The sensible heat of these steam-air mixtures is small compared to their latent heats. The frozen food comes out of the freezer at a temperature of about 0° F. The specific heat of air is 0.24 BTU/lb/° F, and the specific heat of steam is 0.47 BTU/lb/° F. The sensible heat is the product of specific heat temperature rise and mass. Thus, the sensible heat content of 1 pound of 140° F dewpoint steam-air mixture is 38 BTU compared to 133 BTU of latent heat. The sensible heat content of the 160° F dewpoint mixture is 43 BTU. The effect of increasing the dewpoint from 140° to 160° F is to increase the enthalpy of the mixture from 171 to 251 BTU/lb. and to increase the temperature gradient between the steam-air mixture and the frozen food initial temperature by 20° F. This larger temperature gradient would be most important when the food temperature approaches its final value. If an oven at a temperature of 160° F is used to thaw frozen food, 1 pound of the oven air at 160° F would have an enthalpy above 0° F of 38.5 BTU, which is to be compared with an enthalpy of 251 BTU for a pound of the steam-air mixture which is a ratio of 6.5 to 1. Thus, it is found that the dewpoint of a saturated steam-air mixture and a means for controlling it is of paramount importance in the fast thawing of frozen uncooked food without cooking, discoloration, or loss of natural juices. The dewpoint and operating temperature is selected in the range of long term cooking temperature, below the short term cooking temperatue of, for example, meat. The definition of "short term" thus includes the approximate period of time needed for maintaining this condensation process for completion of thawing, and it is basic to the discovery I made, that this steam process of applying thermal energy to the frozen food needs to last only for so short a period that no cooking will ensue.

Steam will precipitate by condensation as long as a mixture of air and steam at saturation contacts the surface of the food and that the food temperature is below the dewpoint. The surface thereof will heat up faster than obtainable with any other type of conduction while it is ensured that the surface of the food will not cook if the flow of steam is terminated sufficiently early.

An operating temperature and dewpoint of 140° to 150° F of a mixture of steam and air as it flows around frozen meat during thawing is most suitable and can be obtained by providing initially a steam-air mixture having about 4.8 to 6.5 pounds of air per each pound of steam. When such a mixture is brought into intimate contact with a piece of frozen meat, one obtains the fastest possible transfer of heat to the surface of the meat without cooking it.

One can see the following: A steam-air mixture having that operating temperature, but being not saturated, contains, therefore, less vapor, and less vapor per unit volume would be available for condensation so that the heat transfer is necessarily less than if saturated steam were used. An increase in the amount of steam available for condensation requires necessarily an increase of the temperature which is not desired, because cooking is to be avoided. Thus, saturated steam at a long term cooking temperature provides optimum conditions of heat transport according to Phase 2.

Without going into details at the moment as to quantitative details, FIG. 1 shows two curves, A and B, each representing the transfer of heat by means of condensation onto a surface at the several temperatures thereof as plotted along the abscissa. The two curves differ by a parameter which is the operating temperature and dewpoint for saturated steam. The selected values are 161° and 168° F, respectively. The ordinate shows values representing BTU per hours.

Thus, these curves represent quantitatively the mechanism of condensation with which heat is transferred onto the surface. These curves have been actually measured, by exposing a plate of 52 inch[2] to the flow of saturated steam. The yield in condensate is an accurate measure for the heat of vaporization thus transferred onto the surface. To facilitate measuring a metallic plate was used, but condensation is independent from the material forming the surface for condensation, so that the curves are representative for all kinds of food. The curves result from interpolation and each actual measured value was obtained by maintaining the surface temperature at the respective temperature-abscissa value for a sufficient period of time so that the accumulated condensate could be determined very accurately.

The curves A and B show the dependency of the heat transfer by condensation upon the surface temperatures. These curves are interesting in that the transfer of thermal energy by means of condensation is at maximum for surface temperatures considerably below the temperature of the steam-air mixture. During thawing, the surface temperature is, of course, determined by the balance of heat inflow by condensation, and conduction into the interior. It follows, therefore, that the maximum amount of thermal energy enters the piece of food when the surface is still quite cool. When the surface has attained the temperature of the steam, condensation ceases. The food temperature could be elevated above the steam-air mixture dewpoint, however, if a source of radiant heat energy was placed above the thawed food with condensate on the food surface which is at the dewpont of the saturated steam-air mixture. The effect of this heat source is to raise the temperature of the condensate on the food surface above the dewpoint which is assumed to be 140° F. The vapor pressure of the condensate at 140° F is 2.9 lbs/in[2]. If the heat raises the temperature of the condensate to 160° F, the vapor pressure of the condensate will increase to 4.7 lbs/in[2]. Thus, there is difference in the vapor pressure of water on the food surface and the partial vapor pressure of water vapor in the steam-air mixture which amounts to 1.8 lbs/in[2]. The effect of this difference in pressure is to greatly increase the number of molecules leaving the surface of the water compared to the number of molecules entering the water surface. The molecules which leave the surface have considerably more energy than the average value of the molecules in the water and, therefore, a correspondingly higher energy level. The difference in energy between the molecules in the water and those escaping is the latent heat of vaporization. The rate of vaporization will be related to the rate of flow of heat into the water surface which subsequently appears as a flow of water vapor from the same surface with the vapor pressure as the driving force.

A similar phenomenon will occur if the radiant energy which heated the condensate was replaced by a sensible heat source. The steam-air mixture could be produced by first heating the air before mixing it with the steam. A saturated mixture with a dewpoint of 160° F is obtained by mixing 4.8 lbs. of air with 1.0 lbs. of steam. If the air is heated, the dewpoint is unchanged. The air at room temperature has a density of 0.075 lbs/ft[3] so that a pound of air would have a volume of about 13.3 cubic feet. If the air was heated to 350° F, the volume would increase to about 20.4 cubic feet, but the density would decrease in the same ratio. The density would be 0.049 lbs/ft[3]. Thus, a mixture of steam and hot air with a mixture temperature of 350° F and a dewpoint of 160° F would have two phases of heat transport to frozen food.

It is useful to compare the enthalpy of the saturated steam-air mixture with a dewpoint of 160° F with the enthalpy of the unsaturated or superheated steam-air mixture with a dewpoint of 160° F and a mixture temperature of 350° F. The enthalpy of the saturated mixture with the 160° F dewpoint was 251 BTU/lb. The enthalpy of the superheated steam-air mixture is 305 BTU/lb. The rate of heat transport from the steam-air mixtures to the frozen food is proportional to the temperature differences. The maximum temperature differences with the frozen food at 0° F would be 160° and 350° F for the saturated and unsaturated mixtures, respectively. Therefore, the rate of heat flow from unsaturated steam-air mixture would be over twice as fast as from the saturated steam-air mixture and the enthalpy available would be about 18% more.

The basic difference between a saturated steam-air mixture and a superheated one is that the saturated mixture will deliver heat to the food only when the food temperature is below the dewpoint. The superheated mixture will deliver latent and sensible heat to the food when the food temperature is below the dewpoint and will deliver sensible heat only when the food temperature is above the dewpoint. The transport of heat to the food when it is below the dewpoint results in the deposition of condensate on the food surface. The transport of sensible heat to the food surface when the food temperature is above the dewpoint removes the condensate by evaporation. It is important to analyze the effect of the dewpoint range on the processes of condensation and vaporization. FIG. 13 shows three curves which are labeled dry air, 160° dewpoint and 130° dewpoint. The abscissa is the food temperature and the ordinate is the vapor pressure. The condensation rate depends on the difference in vapor pressure of the partial water vapor pressure and the vapor pressure of the condensate on the food surface which is assumed to have the same temperature as the food. The top curve labeled dry air is the vapor pressure of water as given in the steam tables. The vapor pressure of water at 0° F is approximately zero so that the ordinate for zero food temperature is identical to the partial water vapor pressure of the steam-air mixture with a dewpoint of 130° F, which is 2.22 lbs/in[2]. The subsequent points on the curve are obtained by subtracting the ordinates on the dry air curve from 2.22 lbs/in[2]. Condensation ceases when the food temperature reaches 130° F where the two vapor pressures are equal. The condensate vaporizes when the food temperature is above the dewpoint and the rate of vaporization is proportional to the difference of the vapor pressure of the water condensate which is given by the dry air curve and 2.22 lbs/in[2] which is the ordinate for zero food temperatures. The curve labeled 160° F dewpoint shows how the rate of condensation increases with the dewpoint and that there is a corresponding decrease in the rate of vaporization. These curves clearly demonstrate that there is a very critical range of dewpoints which can be used in the reconstitution of frozen cooked food. My preferred range of dewpoints is from 140° to 150° F.

Phase 1 of the conduction of thermal energy is now a problem of steam transport. In order to obtain a suitable air-steam mixture in the vicinity of the piece of food to be thawed, it is necessary to generate steam, mix it with air at the desired ratio, and then the steam-air mixture must be transported from a point of region of its generation which is remote from the piece of food to be thawed, to the vicinity of the surface thereof. The generation of the steam-air mixture itself will be described later, and in the following paragraphs the transportation of the steam-air mixture shall be described.

The piece of food to be thawed must be placed in a chamber which permits intimate contact between the steam of the steam-air mixture and the surface of the food. As steam condensate thus precipitates, the steam content is diminished, so that the steam in the chamber must be continuously replenished. More particularly, since the system establishes optimum conditions for condensation at the permitted operating temperature, the condensation very efficiently tends to deplete the mixture of its steam content, so that vigorous replenishing is needed to make fresh steam available continuously in the vicinity of the surface where the condensate is formed.

From a general point of view, it is thus necessary to establish an overall flow pattern around the piece of food to be thawed, so that the steam-air mixture has components of flow normal to substantially all of the surface elements of the piece of food to be thawed. This can be accomplished by providing several injectors blowing toward the food from all sides. However, it is simpler and quite efficient to inject the steam-air mixture into the chamber in a manner which promotes turbulence and sets up a vigorously turbulent flow. It has been known for many decades that heat transfer from a gas to a surface to be heated increases with the amount of turbulence in the flow. I have been unable to find in the literature an expression which provides a quantitative relationship between the amount of turbulence in the gas and the coefficient of heat transfer as a function of the velocity of flow. The effects of turbulence are the same as if the viscosity of the fluid is increased by factors of hundreds, or thousands, or more, and is evidenced by the greatly increased pressures required to produce the flow. In turbulent flow the molecular viscosity is replaced by eddy viscosity which is, of course, many orders of magnitude larger. Sir G. I. Taylor developed the basic equation for the transport of heat and vorticity through fluids in turbulent motion in 1932. The unique parameter in this equation is the eddy viscosity. Tollmien and others developed the equations of the plane and circular jets from which a relation between the velocity and diameter of a circular jet and the kinematic eddy viscosity can be obtained. FIG. 8 presents, for the first time, a function obtained by combining the Taylor and Tollmien equations.

In convective heat transfer, the heat flow is equal to the product of the heat transfer coefficient, the surface area of the object to be heated, and the temperature difference. However, in turbulent jet heat transfer, dimensional analysis requires that the heat flow equation must include an additional factor, namely, the distance of the object to be heated from the jet orifice. The result is that the heat flow without energy loss would be independent of the distance of the object from the jet orifice. The jet turbulence is not fully developed until the jet reaches a distance of seven times the orifice diameter. FIG. 9 shows that the jet width increases directly with distance from the orifice and that the center line velocity decreases correspondingly since the momentum is conserved.

Since turbulence is directly proportional to the product of the diameter and velocity at the orifice, it is obvious that the velocity depends on the static pressure and the flow capacity depends on the jet orifice diameter. In other words, the turbulence depends on the air power available. The turbulence depends on a secondary fluid and is therefore a surface phenomenon. This fact indicates in the first place that space around the jet must be provided for the secondary fluid and that, as shown in FIG. 9, the width of jet increases rapidly with the distance from the orifice. For this reason, the spacing between jets should be at least equal to the jet diameter at the surface of the object being heated.

A second concept derived from the surface interaction analysis and the fact that the turbulence is proportional to the air power, is that there is an advantage in replacing a single large jet with many smaller jets with the requirement that the total original flow be divided between the jets. The diameters of the jets, however, must be so chosen that the static pressure at the jet orifices would be identical with the original pressure.

FIG. 10 displays graphically the increase in the heat transfer of a turbulent jet with the number of jets subject to the above restrictions which are provided by the equations on the graph. This multiple jet arrangement which provides an increase of 100% in the turbulent jet coefficient of heat transfer when one jet is replaced by four smaller jets is a major feature of this invention. The highest convective heat transfer coefficients are obtained by condensing vapors and the lowest are obtained by forced convection of a permanent gas. I found that by using the principles described above that I was able to greatly increase the heat transfer from a vapor aeriform gas to frozen food to be reconstituted. Thus, it became important to make a comparison between the coefficients of heat transfer of a condensing vapor, a turbulent jet and forced air as a function of the velocity of flow. The forced flow of a condensing vapor was investigated by Max Jacob, et al., who derived empirically the equation presented in FIG. 11. It is found in Volume I of his book entitled "Heat Transfer." The heat transferred by a condensing vapor is unusual in that the heat transfer coefficient, when the mixture is at rest, is more than 50% of the value obtained with the velocities that would be practical to use.

The turbulent jet flow of the vapor aeriform gas involves the phenomena of both turbulent jet flow and the flow of a condensing vapor and the composite coefficient of heat transfer is obviously substantially greater than the condensing vapor alone. In its simplest manner the steam-air mixture is injected into the chamber at a pressure in excess of atmospheric pressure, and a venting outlet is provided in the chamber which communicates with the outer atmosphere. Thus, the venting outlet draws the steam-air mixture from its area of injection. The piece of food is supported in the chamber so that a resulting flow completely, or at least substantially envelopes the food. Thus, the flow path in the chamber between the point or area of injection and the point or area of venting must be selected to run in the vicinity of the piece of food to be thawed, i.e., toward and/or parallel to the sides of predominant extension of the piece, and the steam-air mixture must, to a predominant extent, be forced to follow that flow path. This way, the mean flow directly and/or the turbulent cross currents have flow components normal to substantially the entire surface of the food to be thawed.

The turbulence can be established already in the mixing stage for steam and air. Furthermore, the injection of steam and air is coupled with such an enlargement of the cross sectional area of flow to thereby increase the turbulence in the injected mixture. Due to the turbulent flow along the surface of the piece of food, the desired steam content is maintained in the vicinity of the surface in spite of the continuous precipitation of vapor by condensation.

It is important that steam is not permitted to hover over this surface as that would diminish the steam content available for condensation quickly and would reduce the condensation so that, in turn, the amount of latent heat liberated would be reduced. Thus, it is an essential element that by turbulent flow of the steam-air mixture along substantially the entire surface of the food, all surface portions receive fresh steam to maintain a strong condensation.

Throughout the process of steam-air injection the temperature of the mixture will be lowered by the thawing process. There are also various other factors involved in the lowering of the temperature of the mixture in the chamber. Of course, there are some losses to the environment in general. Secondly, not only latent heat is transferred to the cold piece of meat, but there is also the regular heat transport by molecular conduction. Thirdly, the mixture is injected in such a manner that there is a sudden increase in cross-sectional flow area, i.e., the volume available for the mixture expands. This sudden enlargement is a very efficient means of producing turbulence. The loss of heat when multiplied by the rate of flow has the dimension of power and is a measure of the magnitude of the turbulence produced. This loss of head by sudden enlargement is given by the expression $(V_1 - V_2)^2/2_g$ where $V_1$ is the upstream velocity, $V_2$ is the velocity in the enlarged downstream conduit and $g$ is the acceleration of gravity. All these factors, however, can be taken into consideration when selecting the temperature of the injected steam-air mixture.

Turning now to the graphs, FIG. 2, curve $\phi$ illustrates actual measurements of air-to-stream ratios over a suitable temperature range. Steam was produced in a boiler and mixed with air, and the resulting several ratios are plotted as ordinate values. The temperature values used as abscissa for plotting the curves are measured at the ejector exit. The operating temperatures in the chamber will be about 10° below the temperature of injection, which is shown representatively in FIG. 3. This figure illustrates also actual measurements made, when a steam-air mixture was blown into a chamber containing a piece of frozen meat.

Curve D in FIG. 3 represents the temperature of the steam-air mixture in the chamber, which was injected at a temperature of 159° F. Curve D includes all temperature lowering effects exerted on the steam-air mixture after injection. The mixture in the chamber has a temperature initially about 20° below the temperature of injection (159° F) but as the chamber heats up generally, the temperature of the mixture rises to about 150° F.

The curve C in FIG. 3 represents the corresponding rise in surface temperature of a frozen piece of meat. The rise in temperature is, of course, due to intimate and continuous contact of the surfaces with steam as the condensate is formed.

The curves A, B, C, and D of FIGS. 1 and 3 together now represent a quantitative representation of a portion of Phase 1 and of Phase 2 of the thermal transport problem. Within the general definition given above, Phase 1 includes the transport of latent heat by turbulent flow of steam-air mixture into the vicinity of a piece of food to be thawed, and Phase 2 is the condensation of water vapor on the surface of this piece of food. The curves thus show that the thermal energy in the form of a turbulent flow of a steam-air mixture can be transported speedily into the vicinity of a cold piece of meat and, by operation of condensation, thermal energy is transferred speedily to the meat producing a rapid rise in the temperature of the surface (curve C). Concurrently, large quantities of thermal energy are conducted into the interior of the piece of food, because the curves A and B show that maximum thermal energy is transmitted to the surface at temperatures below say, 130° F.

The significance of the curves in FIGS. 1 and 3 resides in the fact that thermal energy can be transmitted from a steam-air mixture to such an extent that the surface temperature of a medium rises quite rapidly. From the foregoing, it follows that a fast transfer of thermal energy to the surface of a frozen piece of food without cooking its surfaces can be obtained by providing steam and mixing it with air so that the mixture is about saturated and has a temperature of about 160° to 170° F. The latent heat of the steam is the prime carrier of thermal energy. The mixture is brought by turbulent flow into contact with substantially the entire surface of the food. By condensation, heat is transferred to the surface of the food without cooking and the turbulent flow along the surface of the food replenishes the steam as fast as it condenses.

I shall now proceed in describing the phenomena observable as far as conduction of heat into the interior of the piece of food is concerned. The reason for this analysis is to determine to what extent the fast heat transfer to the surface of the food operates for thawing of the piece of food in its entirety. I shall thus develop how the thermal energy enters the frozen piece of food. An exact analysis would require solving the differential equation for heat conduction, which would involve extensive mathematics because the melting process would enter into the formulas as a heat sink of variable size, and because I found that the pertinent thermal properties for the flow of heat and temperature propagation differ for frozen and for thawed meat. For the present case it suffices to proceed qualitatively and on the basis of differential approximations.

I consider the meat as being divided into laminae running parallel with the surface of the meat. The surface lamina is the one which receives directly the heat in accordance with the characteristics shown in FIGS. 1 and 3. Initially, the surface of the meat may have a temperature of about 0° F. The heat flux into and through the first surface lamina will determine its temperature. During a first period of time that heat flux is about linearly proportionate to the thermal conductivity $\eta$ of the frozen piece of food, which, for beefsteak I have measured to be 0.0036 in CGS units. Since at this point nothing has been thawed, the same conductivity prevails throughout the meat. FIG. 4a represents that state schematically. The temperature rise in the first lamina and in succeeding laminae is then proportional to the heat flux and the inverse product of density $p$ and specific heat C having values 1.12 and 0.43, respectively (in CGS units). Thus, the temperature rise is proportionate to $\eta/\rho$ C commonly called the diffusivity and having a value for frozen beefsteak of 0.00745 (CGS). This diffusivity thus determines the speed with which the temperature of the frozen food may increase as long as frozen and up to the thawing point, by operation of conduction.

Turning back to the surface laminae, during the first time interval considered, the temperature of this laminae will rise to the thawing point, which is below 32° F, due to the fact that the frozen liquid in the meat is an aqueous solution of various salts. As a matter of fact, due to the different types of material that make up a piece of meat, one cannot speak of a thawing (or freezing) point for meat as an exact temperature value. There is rather a softening that begins at about 27° F and is completed at about 30° F.

A second time interval now succeeds the first time interval and its duration is determined by the time it takes a particular volume of this laminae to receive the amount of heat equal to the heat of fusion so as to undergo complete thawing. I have measured a value of 46.2 calories per gram of frozen beefsteak, which is 57.7% of the value of the heat of fusion of ice crystals. This can be regarded as a rather high value. FIG. 4b schematically illustrates a cross section into the interior of a piece of meat during this second time interval for the surface laminae.

A third time interval will succeed the second one. The surface laminae have thawed and increased in temperature. This is shown in FIG. 4c and FIG. 4d. The flux of heat in the first, surface lamina will be linear with the conductivity of thawed meat, which I found to be 0.0036 (CGS) or about 31.4% of that of frozen meat. The influx of heat will increase the temperature of this laminae from about 30° to 32° F up to a value which depends on the time the surface is subjected to the steam-air mixture. The temperature increase is again proportional to the heat flux and inversely proportional to the density and specific heat product, i.e., the diffusivity of the thawed meat.

For thawed meat I have measured C = 0.63 and the density of thawed beefsteak is 1.17, all in CGS units. Thus, the diffusivity is 0.0013. This value now determines the speed of temperature rise in the thawed meat. Thus, there is the amazing fact that the diffusivity of frozen beefsteak is 6.6 times the value of thawed beefsteak. Thus, the spreading of a particular thermal condition is 6.6 times faster in frozen meat than in thawed meat.

Take now any laminae, in each of them there is a first period during which the temperature rises up to the thawing point, this first period is necessarily the longer the deeper is the laminae underneath the surface, and it will have maximum duration for the center laminae. The temperature rise, however, is determined in accordance with the high value of diffusivity for frozen meat. The second period is the one during which the laminae absorbs the heat required for fusion to undergo thawing. The third period is that during which the respective laminae increases in temperature in accordance with the low value for the diffusivity of thawed meat.

I have measured the thawing process in a very thick piece of meat and the result is plotted in FIG. 5. The ordinate shows meat temperature and the abscissa time. The parameter for the group of curves plotted in depth, with curve E representing again the surface temperature. The steam-air mixture was injected with a temperature of 168° F prior to turbulent expansion in the thawing chamber. The curves should actually all originate at a common temperature as the meat, when in a deep freezer for some time, will have a constant temperature throughout. However, some time elapsed between removing the meat from the freezer and the setting up of the measuring equipment.

A critical evaluation of these curves reveals clearly the suitability of steam-air for thawing of meat. The time zero in this diagram was the time in which a steam generating boiler produced enough steam to be mixed with air, so that the mixture had the operating temperature of 168° F prior to injection into a thawing chamber and heating thereof. FIG. 5 now reveals that the turbulent flow together with the condensation produces not only a rapid rise in the surface temperature, but induces a considerable influx of thermal energy into the interior. On the basis of curve A, shown in FIG. 1, it follows that as soon as the flow of steam and air begins, immediately there is a high influx of heat into the meat. From curves such as F, G, and H in FIG. 5, one can seen now that the high diffusivity of the frozen food results in a rapid propagation of heat into the interior, and within a few minutes there is a rapid temperature rise in the meat layer about $\frac{1}{2}$ inch thick and before the surface temperature has exceeded 130° F. Below 130° F meat cannot possibly cook on a long term basis, let alone in the few minutes that have elapsed since the frozen meat was placed into the chamber.

On the other hand, one can see that for greater depths—curves I, K, and L—it becomes noticeable that further influx of heat is impeded by two factors. After about, say 15 minutes, thermal energy traveling toward the interior has to travel through large portions of thawed meat where the diffusivity is only 15% of that of frozen meat, so that the temperature can rise in these thawed portions only very slowly. Thus, the temperature gradient in the thawed meat is quite low and this accounts for the slow rise in temperature in the interior. Moreover, the surface temperature, when above about 130°, diminishes the influx of heat by condensation.

By comparing FIGS. 4 and 5, one can see that, initially, heat conduction into the interior of the meat (FIGS. 4a, 4b) is quite fast, thus setting up a thawing zone on the surface of the meat. As the process continues over several minutes, the thawing zone deepens at first and then begins to propagate into the interior. The speed of propagation of this thawing zone then slows down because, due to the poor diffusivity of thawed meat, further heat has to travel through the thawed surface and subsurface zone which deepens continuously.

From an analytical standpoint, therefore, a truly fast thawing process is limited to those situations in which the period of conduction in thawed meat in the outer laminae is not too long before the actual thawing has begun in the laminae remotest from the surface. The thawing zone should reach the center of the meat before the thawed surface and subsurface zone is too thick. A steep rise in the external surface temperature during the time of conduction through thawed meat of the outer laminae counteracts to some extent the low diffusivity in the thawed meat, and as long as the surface temperature is still low, there is a large influx of heat. The heat flow thus increases with the increasing temperature gradient as thus set up in the thawed meat portion, but when the surface temperature begins to level off, the low diffusivity in the thawed portion becomes the controlling factor as the temperature gradient in the thawed portion will begin to decline while the heat influx diminishes also. Thus, the meat should have a thickness so that thawing is completed in about 10, or at the most, 15 minutes.

In FIG. 6a, curve M shows the thawing time of the center (and thus the time of completion of thawing) of several pieces of round steak, having different thickness plotted as abscissa values. The ordinate shows time, and an injection temperature of 157° F was used. The curve verifies numerically what has been concluded qualitatively earlier, namely, that thawing time increases drastically with size, but is very small for meat of, say 1 inch thickness and below. A practical limit is a piece of meat having about $1\frac{1}{4}$ inch thickness requiring about 16 minutes actual thawing time.

About 5 to 6 minutes are required for thawing meat about $\frac{7}{8}$ inch thick which is the standard size for most supermarkets. If meat is too thick, it will not thaw very fast since the slowness of the propagation of heat through thawed meat takes over. This does not render the present method useless, but for too thick pieces of meat its advantage over other methods of thawing will diminish. Here one has to consider also the fact that for the chosen temperatures of steam (150° to 170° F) some cooking will occur if that steam is applied for hours. However, it will be appreciated that in any event the thawing will still be better, even for very thick pieces of meat, than obtainable with excessive surface temperatures, or merely with room temperature.

FIGS. 5 and 6a illustrate a very interesting aspect. A piece of meat about 1 inch thick will thaw in about 8 or 9 minutes provided the steam-air mixture envelopes the meat completely, so that the deepest layer to be thawed is about $\frac{1}{2}$ inch from the flat surface. The curve K in FIG. 5 shows that more than an hour will elapse before the heat has traversed about 1 inch down from the surface. Thus, if one would cover one surface completely, for example placing it on a pan, that same piece of meat would take about an hour to thaw.

It is further interesting to compare this thawing pess with relatively low temperature steam cooking, which requires, of course, the establishing of cooking temperatures throughout the food to be cooked in this manner. Here the temperature increase propagates through the meat only at the low diffusivity for thawed meat. If the surface temperature, the transmission of heat from the steam to the surface will be very small and the temperature propagation for small heat inflow at a low diffusivity is very slow. For steam thawing, there is an initial period when the temperature propagation through the meat depends on the high diffusivity of frozen meat while concurrently the still rather low surface temperature permits maximum transfer of thermal energy to the surface by condensation as shown in FIG. 1, curves A and B.

Now it has to be observed that for thawing, the center never has to reach the surface temperature, but only about 30° to 32° F. For cooking, the center has to be heated up to the cooking temperature. Thus, it is proven that the inherently slow process of low temperature steam cooking cannot at all be compared with steam thawing. The surprising fact results that steam thawing is a very fast process indeed and this is due to the fact that considerable quantities of thermal energy are developed on the surface and can enter and penetrate the interior with a rather high diffusivity.

The following information gives more detailed information on the phenomenology briefly described in FIG. 6a and in addition, describes the basis for the lower curve in 6b. The study was conducted by first preparing slabs of beef of identical length and width but of varying thicknesses. A thermocouple was inserted into the centroid of the slab which is the last region to thaw. The meat was heated by parallel flow of a vapor air mixture over both sides. The mixture temperature and dewpoint was 161° F.

The rate of flow of heat in a solid depends on the thermal diffusivity which is the only parameter in the Fourier equation and which is defined as the ratio of the thermal conductivity to the product of the density and specific heat. The thermal diffusivity of frozen beef, is over six times the corresponding value of the thawed state, and the measured value of the latent heat of fusion was 57.7% of the value for water, and therefore represents the water content. The water content of frozen foods is the major factor in determining the thermal diffusivity.

One particular solution of the Fourier equation states that the time for heat to flow from the food surface to any interior point is directly proportional to the square of the distance from the surface to the given point, and also the time is inversely proportional to the diffusivity. Thus, a food portion which is twice as thick will take four times as long to reach the same temperature. The lower curve M is the "Law of Times" equation and for small ratios of thickness gives a good approximation. The difference is undoubtedly due to the change in diffusivity between the frozen and thawed states. This empirical function together with the conditions under which it was obtained provide three requirements for producing a fast thaw process:

1. Frozen food should be provided with thicknesses preferably less than $1\frac{1}{8}$ inch;
2. Heat must flow simultaneously into both the top and bottom surfaces since, if heat enters only one of these two surfaces, the effect would be approximately equivalent to doubling the thickness of the food which, according to FIGS. 6a and 6b, would mean a greatly increased thaw time;
3. The convective heat source must have the capacity to supply heat at a rate equal or greater than the rate that the frozen food can absorb heat during the thawing process.

The most important variable in the reconstitution of frozen food process is the time required to thaw and heat the food to the serving temperature. There are three stages in the reconstitution process which are differentiated from each other by changes in diffusivity of food in the frozen and thawed states and by changes in the heat transfer characteristics of the vapor aeriform gas when the food temperature is below and above the dewpoint of the vapor aeriform gas. The first stage enjoys the highest possible heat flow from the vapor aeriform gas to the frozen food. Assume that the vapor aeriform gas has a temperature of 400° F and a dewpoint of 140° F and that the frozen food leaves the freezer at a temperature of 0° F. The high diffusivity of frozen food is due to its large water content. The diffusivity of water when it is in the ice crystal state is more than six times its value in the liquid state. Thus, the heat transfer from the vapor aeriform gas with a temperature of 400° F to the frozen food at an initial temperature of 0° F in combination with the high diffusivity of the frozen food will jointly thaw the frozen food in 2 or 3 minutes, depending on the food thickness. The food thaws at about 30° F because of the electrolytes in the food which lower the freezing point. The mean temperature difference between the vapor aeriform gas and the food during the first stage is 385° F. The food enters the second stage with a diffusivity of about 15% of its value during the first stage and has an initial temperature difference between the vapor aeriform gas temperature and the food temperature of 370° F.

During the second stage, the food temperature will go from 30° to 140° F which is the dewpoint of the vapor aeriform gas. The mean temperature difference between the vapor aeriform gas and the food is 315° F. During the first and second stages the heat flow is primarily due to the condensation of the water vapor in the vapor aeriform gas on the food. However, the turbulent jets of the vapor aeriform gas on the top and bottom surfaces of the food provide a substantial flow of sensible heat to the food.

During the third stage, the food temperature will go from 140° to 160° F if the final desired temperature is 160° F. The mean temperature difference during the third stage is 250° F. The heat transfer from the vapor aeriform gas to the food during the third stage is by convective turbulent jets. It is fortunate that it is only necessary to raise the food temperature about 15° or 20° F in order to remove the condensate which was deposited on the food surfaces during the first and second stages. The great value of the condensate in regard to food quality will be derived in the following discussion.

The quality of reconstituted frozen food is almost as important as the reconstitution time which, of course, is of paramount importance. The prior art method of reconstituting frozen food is to place it in a preheated oven for a sufficient length of time. The temperature of the food adjacent the sides acquires a much higher temperature than the food in the center of the container because the heat flows into the peripheral region of the food adjacent the container sides in addition to flowing into the top and bottom surfaces of the peripheral region. On the other hand, the food in the central region only receives heat from its top and bottom surfaces. The water content of the food which is usually more than 50% of the food mass is distributed more or less uniformly because of the tendency of an electrolyte to move from a region of high concentration to a region of lower concentration is in proportion to the difference in the electrolyte concentrations in the two specific regions. This phenomenon is called Ficks Law of Diffusion. Food could be considered to act like a bed of sand or a blotter. If water is added to one region of either, the water will speed to the contiguous regions until the materials are uniformly met. The water in the surface of the food is at a higher temperature than the interior regions since there is a temperature gradient between the outside surface and the interior until temperature equilibrium is reached. The vapor pressure of the water in the top surface of the food is given by the top curve labeled dry air in FIG. 13. This water vapor will leave the food surface by the action of the turbulent jets of vapor aeriform gas striking the surface. The turbulent jets bring heat to the surface and take the water vapor away. When the water vaporizes on the surface and leaves the surface layer, it produces a void. The result is that the water in the layer of the food below the surface layer will flow into the void since a concentration gradient exists. The vaporization of the surface layer of water is a constant temperature process. If water is heated in a pan to the boiling point, the temperature of water will remain constant. When the water is all evaporated, the temperature of the pan will rise rapidly. Thus, the latent heat of vaporization of the water acts as a thermostat. When water leaves the surface of a sand bed, the void must be filled by the interior water flowing through the smaller spaces between the sand particles. This flow is generally called either capillary flow or creeping motion. The rate of flow varies directly with the fourth power of the diameter of the capillary path and this flow follows the Hagen-Poiseuille Law. The rate at which the surface moisture in the food evaporates increases rapidly with the food temperature as shown by the dry air curve in FIG. 13. When the rate of vaporization exceeds the rate of capillary flow, the void becomes permanent. When the void is permanent, the food surface temperature is no longer controlled by the latent heat of vaporization of the surface moisture. The food surface discolors, cakes, and when hot enough will char. Returning now to the three states of the constitution process, it is found that during the first two stages there is a continuous deposition of condensate which increases slightly the water concentration in the surface layer of the food. During the third stage, there is a continuous vaporization of the condensate. If the reconstitution time interval was so chosen that the condensate had all evaporated exactly at the end of the third stage, there would have been condensate on the food surface during the entire process. This condition would produce the highest possible food quality. However, if the food was heated, for example, a 50% longer time, the food quality would still be quite good because the vapor aeriform gas contains a large quantity of water vapor which exerts a partial water vapor pressure which opposes the higher vapor pressure of the vapor pressure of the surface moisture, thus greatly reducing the rate of vaporization of the surface moisture. If the rate of flow of the water in the interior region of the food to the surface void is equal to the rate of vaporization of the surface moisture, the temperature of the food surface will not be differentiated from the bulk temperature of the food and the food quality will be maintained.

In review, I have established that frozen food can be thawed in a minimum time interval when exposed to the convective flow of a homogeneous mixture of water vapor and air. This mixture will be designated as a vapor aeriform gas. The subject frozen food can be divided into two categories, namely, cooked and uncooked foods. The dewpoint of the vapor aeriform gas is its most salient feature. Frozen uncooked food can be thawed in a minimum time interval with a vapor aeriform gas which is saturated and which has a dewpoint in the range of 160° to 170° F. If the dewpoint is in the 140° to 150° F range, the food appearance is better, but the thawing time is longer. Frozen cooked food can be thawed in a minimum period of time with a superheated vapor aeriform gas having a mixture temperature in the range of 350° to 400° F and with a dewpoint in the 140° to 150° F range. Thus, the mixture temperature is substantially higher than the mixture dewpoint. The highest coefficients of heat transfer in convective gas flow are obtained with a vapor aeriform gas. The diffusivity of food which is very high while in the frozen state compared to the normal state provides a maximum flow of heat from the food surface to the food interior regions and thus complements the high rate of flow of heat from the aeriform gas to the food surface. The heat transfer from the vapor aeriform gas to the food surface is greatly increased by using turbulent jets which direct the flow of the vapor aeriform gas normal to the food surfaces of greatest extent which are usually the top and bottom surfaces of the frozen food. The thawing process has a concomitant deposition of condensate on the food surface during the time that the temperature of the food surface is below the dewpoint of the aeriform gas. When uncooked food is thawed, it is not necessary to remove the condensate before cooking. The reconstitution of cooked food has a basic requisite that the food must be heated in the vapor aeriform gas to a temperature above the dewpoint of the vapor aeriform gas so that the condensate will be removed from the food surface by vaporization.

The apparatus is provided with a boiler 10 having, for example, a flat bottom 11 for placement on a gas stove or an electric cooking range. The boiler 10 is closed except for two openings. The opening 12 defines an inlet port for filling the boiler with water. The water should be accurately dosed because no more water is needed than is necessary for evaporation during the period of time required for completely thawing a particular piece of meat. During thawing operations the opening 12 is closed, for example, by means of a threaded stopper 13 so that the interior of the boiler 10 can communicate with the exterior of the boiler through a pipe 15 only.

Pipe 15 terminates in a nozzle 17 which pertains to an ejector 20 and serves a primary nozzle. The dimensioning of the nozzle opening is critical as will be developed in detail below. The pipe end 15 is partially enveloped by a sleeve 19 also enveloping the flared inlet 22, which is the secondary nozzle of the ejector 20. Inlet 22 is positioned coaxial with nozzle 17. The sleeve 19, furthermore, has an opening 18 for admitting air to the ejector. The opening 18 is laterally disposed in relation to both the primary nozzle 17 and the inlet or secondary nozzle 22 of the ejector 20.

As heat is supplied to the boiler the water therein begins to evaporate and finally will come to a boil. A steam jet will be expelled in upward direction from the nozzle 17 as a free jet. The resulting pressure drop in the vicinity of the nozzle outlet operates for suction of air to be sucked through the opening 18 so that the air as well as steam enters the secondary nozzle 22 of the ejector 20. The secondary nozzle 22 leads into a cylindrical portion 24 which defines a constant area mixing device of the ejector 20 in order to produce a homogeneous steam-air mixture. Experiments conducted at MIT have led to the conclusion that constant area mixing in a tube having a length of about six times its diameter produces a highly homogeneous mixture.

The constant area mixing chamber 24 leads into a diffuser 26 terminating in an outlet 28. The diffuser angle is about 8° as it offers minimum losses for the conversion of velocity head into pressure in the diffuser. The pressure head produced at the outlet of diffuser 26 is dependent upon the boiler pressure. However, the mixing ratio $\phi$ of air and steam is independent from the boiler pressure. I have found that a length of the diffuser about 10 times its inlet diameter produces a pressure head at the diffuser outlet which is sufficiently high for the inventive purpose. The diameters of diffuser outlet and inlet have a ratio of at least 2 to 1.

The ejector 20 thus constitutes a combined pressure blower and mixer. It forces a gas at atmospheric pressure to the diffuser outlet, with the pressure head being in excess of atmospheric pressure. The ejector further provides a mixture with steam and homogenizes it by strong turbulence. The ejector 20 is of the same form and principle as the atmospheric gas burner used on a gas range. The burner mixes gaseous fuel and air in exact ratios and forces the air-gas mixture through the burner ports.

The ejector controls the composition of the vapor aeriform gas which in turn defines the dewpoint of the mixture. FIG. 2 shows that an ejector with a throat diameter of 7/32 inches will provide a dewpoint of 155° F if the steam nozzle has a diameter of 0.062 inches and if the nozzle diameter is increased to 0.082 inch, the dewpoint is raised to 168° F. The ejector is as precise a device for controlling the dewpoint as a venturi meter which measures the flow of a fluid, since both operate on the same principle.

Figure 7:
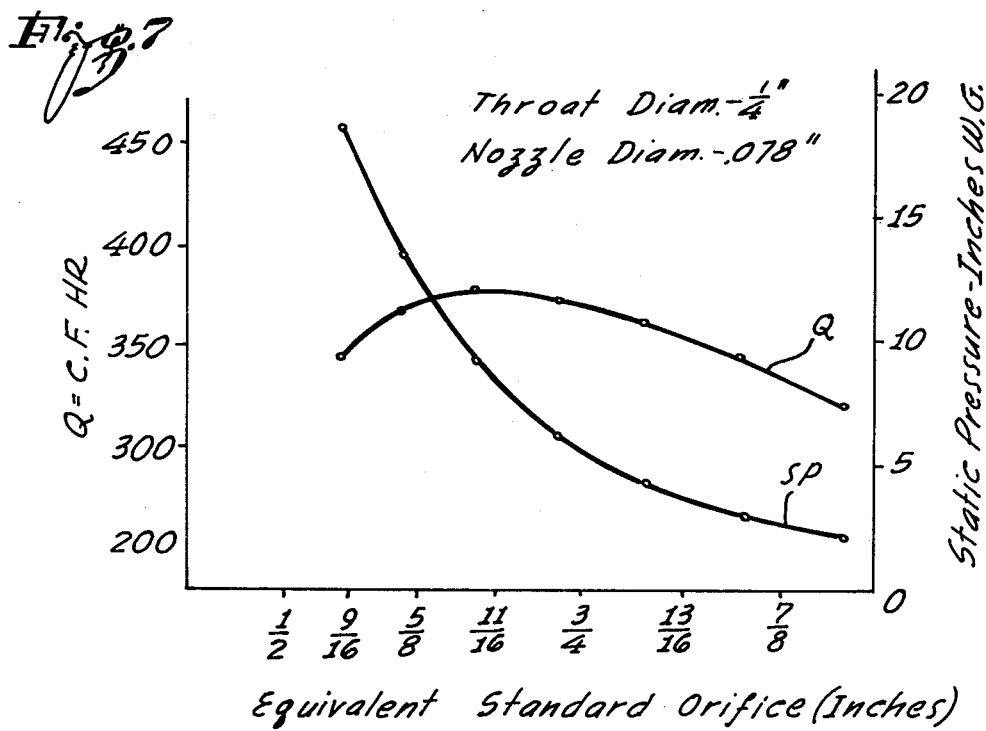
FIG. 7 illustrates two measured curves, respectively representing pressure in a thawing chamber and rate of flow of steam and air as a function of various equivalent standard size orifices approximately representing different venting outlet sizes for a thawing chamber charged with a steam-air mixture.

FIG. 7 shows that an ejector is equivalent to a centrifugal blower. The ejector 20 will deliver about 380 cubic feet of gas per hour against a static pressure of about 12 inches w.c. If a larger throat is employed, the ejector will deliver a correspondingly larger flow against a smaller pressure. This is equivalent in the case of a centrifugal blower to increasing the diameter of the centrifugal blower wheel and reducing the speed of the wheel in order to maintain the mechanical power. The pressure will be reduced in the same ratio. A centrifugal blower wheel is also an excellent mixer of two gases. Commercial gas burners use a centrifugal blower to mix gaseous fuel with air. Thus, the ejector can be replaced with a centrifugal blower to mix steam and air together and force the mixture over frozen food. In this case, it is no longer necessary for the steam to be under pressure. The water could be heated in an open pan and the steam could flow into the blower inlet along with the air. The ejector thus constitutes a combined blower, mixer and means for controlling the dewpoint of the vapor aeriform gas. The ejector 20 and boiler 11 are, of course, a steam engine which transforms the heat energy from the gas burner into the mechanical energy of a motive fluid and thus is equivalent to the electric motor driven centrifugal blower. During operation of ejector 20, a homogenized flow of air and steam mixture leaves the opening 28 with a pressure above atmospheric pressure to enter a deflection chamber 30, which can be regarded as an ante-chamber for the thawing chamber 34. Thus, the ejector 20 operates as injector for the thawing chamber. Spacer and support rods 14 separate the bottom 32 of the thawing chamber 34 from the top of the boiler to prevent undue heating of the thawing chamber in excess of the desired operating temperature.

The opening 28 is defined by an opening in the bottom plate 32 of the thawing chamber 34. The deflection chamber 30 is centrally located on this plate 32 and has a horizontal top 31 and laterally oriented openings 33 which deflect the vertical, turbulent flow of the steam-air mixture into horizontal directions. The openings 33 are arranged around a cylindrical circumference of the deflection chamber 30, and, therefore, provide a radially outwardly directed flow of the steam-air mixture, in all directions and away from the axis as defined by the ejector 20. It follows, therefore, that the ejector 20 terminates in a region producing a sudden enlargement of cross-sectional area with regard to the flow of the steam-air mixture. As this is coupled with a deflection, strong turbulence is further provided in the flow.

There are next provided a number of vanes 36 which serve as a means to enforce a more or less uniform distribution in radially outwardly directed flow of the steam-air mixture. The vanes 36 have upper surfaces 38 which together with the top 31 of the deflection chamber 30 define a horizontal surface 40, which is a supporting surface for a piece of meat, such as 42, to be thawed. The meat is placed flat on the vanes 36. The vanes 36 have radially outwardly directed dimensions so that the steam-air mixture is in fact guided rather uniformly radially and close to the inner cylindrical surface of a cover 44. Cover 44 and bottom plate 32 together define the thawing chamber 34.

The cover 44 has an opening 46 through which projects a sleeve 48 providing an upper venting outlet 49. Sleeve 48 can be raised or lowered and thus can be lossely seated on top of the piece of meat 42 to be thawed. The sleeve or tube 48 has legs so that openings 50 are defined between sleeve 48 and the meat. The thawing chamber 34 communicates with the outer atmosphere exclusively through these openings. Thus, the steam will be collected to pass through the openings 50 for exhaust through the venting outlet 49.

Since by operation of the ejector-injector 20 a relatively high pressure is established in the deflection chamber 30, there is a pressure gradient as between, for example, the inlet openings 33 for the thawing chamber and the venting opening 48 where, of course, atmospheric pressure prevails. Thus, the steam-air mixture will travel from the openings 33 by turbulent flow along the under surface of the piece of meat 42, around its sides, along the top, to be collected by the centrally located openings 50.

A piece of meat such as 42 when placed on the surface 40 is completely enveloped by a turbulent flow of steam-air mixture. It is an important aspect that deflection chamber 30 is not very big, and it is also important that these top surfaces 38 of the vanes 36 are in fact rather narrow, at most a few millimeters or less, so that only a small portion of the underside of the meat is not exposed to the turbulent flow. The vanes 36 may be mounted on a separate plate 35 of smaller diameter than the bottom plate 32, leaving a circumferential trough in which condensate may collect.

The total heat content of the steam as injected into the thawing chamber is divided between pressure energy and thermal energy including the latent heat, and the proportion will vary with the size of the primary nozzle. The pressure head at the diffuser exit is primarily dependent on the boiler pressure, and the cross-sectional area ratio as between diffusion entrance and exit. As the steam-air mixture leaves diffuser exit 28, the effective cross-sectional area is rapidly enlarged coupled with a deflection of the flow so that heavy turbulence is set up in the flow as it spreads radially outwardly underneath the meat 42 in the channels as defined by the vanes 36. As mentioned earlier, FIG. 3, curve D, illustrates, for example, the temperature in the chamber 34 for a nozzle of 0.067 inches at a boiler pressure of 11 psi and an ejector steam-air temperature of 159°. The curve C, also shown in FIG. 3, illustrates the concurrent rise in temperature of the surface of the meat to be thawed.

It is an important aspect of the thawing apparatus as illustrated, that the flow from the ejector when flowing over the surface of the meat has a higher concentration in the center of the surfaces of predominant extension than at the outer rim. Particularly the collection of the steam on centrally located orifices 50 favors a higher steam density in the central surface portion of the meat. This ensures a rather uniform thawing process because the outer portions of the meat are also bounded by its rim through which heat flows also. The top 31 of the deflection chamber provides some shielding of the center; this was found advisable as a direct hitting of the meat by the ejected steam-air mixture may cause some juice extraction and too fast a heating of the center region which is also not desirable. Now some practical consideration should be given to the operation of the device shown in FIGS. 15 and 16.

The first aspect to be considered is, that for using this equipment as a home household appliance, there is a limitation in the available heat sources. Electric range elements usually are wired for a maximum load of 2150 watts; smaller wall receptacle type heaters are usually limited to 1,500 watts, and the maximum size gas range burners develop 9 to $10 \cdot 10^3$ BTU per hour. This limits the maximum rate of generation of steam. Of course, the total amount of steam developed by the boiler 10 will depend on the amount of water available for evaporation. One will use as little water as possible in order to shorten the time between application of heat to the boiler and the development of sufficient pressure therein for the generation of the steam-air mixture.

I found that a $\frac{7}{8}$ inch thick steak requires the vapor of about 8 oz. of water, and a $1\frac{1}{4}$ inch thick steak will require the vapor of about 26 oz. of water. Thus, a boiler when placed on the gas range at maximum flame, will evaporate 8(26) oz. of water for the time it takes a $\frac{7}{8}$ inch ($1\frac{1}{4}$ inch) thick steak to thaw. The starting time of the thawing process can be defined, when about 10 to 12 pounds in$^2$ pressure has been developed for a nozzle of 17 of 0.067 inch diameter. The boiler 10 was used on a gas range and had a diameter of about 10 inches made of aluminum. I found that 8 oz. of water took about two minutes to develop the operating pressure of about 10 lbs./inch$^2$; for 26 oz. the time was about 6 minutes. For an average of about 16 oz. of water, the pressure rose by about 1 psi every 10 seconds. The maximum pressure reached will be independent from the amount of water, as the difference in volume in the pressure chamber for the different amount of water is negligible.

The maximum operating pressure has been reached in the boiler when there is thermal equilibrium in the boiler. This equilibrium is established between the steam production and steam discharge. One can always assume that the user of the thawing device will use maximum heat output of the range or stove so that the variable equipment factor for the pressure at equilibrium is the size of nozzle. For a 0.067 inch nozzle and a maximum size gas range the operating pressure is about 12 lbs/inch$^2$ and about 1.4 fluid oz. evaporate for each minute of operation.

The curve N in FIG. 6 now depicts total thaw time for a 0.067 inch nozzle, which is the combined starting time and the actual time of thawing as shown in curve M. The starting time was measured when for each piece of meat having a thickness in accordance with the abscissa value plotted in FIG. 6, just the right amount of water was filled into boiler 10.

It is an interesting aspect, that the device includes inherently a timing device. The amount of water in the boiler can be selected so that it is evaporated after the particular period needed for thawing, whereafter the production of steam ceases. The nozzle 17 produces an audible whistling noise as long as steam is being produced and injected in the thawing chamber. When the whistling noise ceases, the water supply is exhausted, and if it was properly metered, the meat will be thawed. Thus, the user will be furnished with a chart showing the amount of water needed to thaw a piece of food having a particular thickness.

I now turn to a discussion of suitable operating ranges. As stated above, curve φ in FIG. 2 shows mixing ratio as a function of the dewpoint of the vapor aeriform gas. FIG. 2 also shows the various nozzle sizes used for establishing these ratios and dewpoints. The air content of the vapor aeriform gas decreases with increasing size of the primary nozzle 17 if the throat diameter of the ejector remains constant. FIG. 2 also shows that the boiler pressure must go down for the same rate of heat influx of heat to the boiler when one selects a larger size for the nozzle 17.

It should be emphasized that two basic distinctions must be made. An ejector of this type produces a mixing ratio, which depends only on the primary-secondary nozzle ratio, and not on the pressure of the source to which the primary nozzle is connected. Thus, for a given nozzle arrangement the mixing ratio φ and the dewpoint of the ejected mixture is independent from the boiler pressure if the latter varies. On the other hand, for a given boiler, as is here the case, the pressure varies with nozzle size, and thus it appears from the cruves in FIG. 2 as if the mixing ratio also varies with the boiler pressure, which is not the case. Curve φ and curve P can thus individually be interpreted as a function varying with the nozzle size, but these curves cannot be interpreted in that mixing ratio per se varies with pressure.

Of course, the dewpoint increases with a decreasing content of air in the mixture, and one can see, that for primary nozzles of about 62 mils to about 82 mils with a secondary nozzle of 7/32 inch throat diameter one covers a range of dewpoints from 155° to 168° F.

Of course, the actual nozzle sizes, in inches, have meaning only with the particular boiler and heat source used, and the figures here are related to an equipment design for a home use thawer and the normally available heat source in the home. The primary, and equipment-independent characteristic upon temperature. For an ejector as mixing device, the area ratio for the primary and secondary nozzles is the variable equipment factor of principal importance. The nozzle sizes themselves enter into the consideration only for realizing this curve φ for a heat source as available in the normal household kitchen.

Bearing this in mind, I found that for a nozzle size of 62 mils, the performance was noticeably poorer, i.e., slower than for a nozzle of 67 mils so that a mixing ratio of about 1:4 (air to steam) having a dewpoint about 155° is approximately the lower limit of a satisfactory performance. I found further that for nozzles of 86 mils and larger the turbulence is not too vigorous any more and performance likewise dropped.

The velocity of the steam in the nozzle 17 is very high. As mentioned before, I have found that the highest performance is obtained when the steam pressure reaches the critical pressure which is about 22 psi, at which the steam velocity reaches the velocity of sound, which, of course, depends on the properties of the gas, which is in this case steam. When a gas flows through a tube, there is a loss of pressure which is given by the usual Darcy's equation. This equation states that the head loss is equal to the product of a frictional factor which is an empirical factor which depends on the Reynolds number of the flow and the inside surface finish of the tube, the ratio of the length to the tube diameter, and the velocity head. Since the velocity is equal to the ratio of the flow rate to the tube area, the velocity head becomes proportional to the ratio of the flow rate squared divided by the fourth power of the diameter. Thus, the head loss becomes proportional to the product of the friction factor, tube length, and flow rate squared divided by the fifth power of the tube diameter. The reason for the very poor performance of the 62 mil nozzle compared with the 82 mil nozzle was because the head loss of the 62 mil nozzle had a comparative loss which is equal to the ratio of 82 to 62 raised to the fifth power which is a factor of 4 to 1. I also found that the smallest practical size nozzle had a diameter of 70 mils-1.84 to 1 loss.

Having determined the most suitable range for the nozzles of the ejector, I found further that a distance of the primary nozzle 16 from the plane of the throat of the secondary nozzle should be about 1/16 inch. For this distance the free jet emerging from nozzle 17 has enlarged its diameter of the width of the mixing tube 24 right where the flared portion of the secondary nozzle 22 merges into the mixing tube.

The cooperating conditions can be optimized by a still further aspect. The thawing chamber 34 as it extends from the ejector outlet 28 to the venting outlet 49 is a load for the ejector operating as a blower. This load can be defined by an equivalent standard orifice. It is well apparent from the drawing that the size of the outlets 50 when small constitute the predominant component of the regular load on the ejector-pump when charging the thawing chamber, so that the total area size of the outlets 50 becomes quite comparable with an equivalent standard orifice.

I have used an ejector of the type described with a primary nozzle 17 of 78 mil and a secondary nozzle 22 of ¼ inch throat diameter, and I have connected the outlet of this ejector to work against a single orifice constituting the load. As plotted in FIG. 7, I varied the size of the orifice and measured the pressure head at the ejector outlet 28 (curve SP) and the rate of flow (curve Q) of the steamair mixture. One can see the following interesting points.

For too large an equivalent standard orifice, corresponding to a large venting opening as defined by all apertures 50 the rate of flow is quite low. This is detrimental to the transport of sufficient steam into and through the thawing chamber. For too small an equivalent orifice as venting outlet of the system, the outlet operates as a throttle, and the pressure in the thawing chamber will go up operating as back pressure which retards the outflow of steam. The flow curve Q has a maximum for a particular equivalent standard orifice of about ⅜ inch diameter.

For fast thawing in accordance with the inventive method and apparatus it is important that the food be exposed at all sides to the turbulent flow of the steam-air mixture. The turbulent flow must also have flow components which are normal to the food surfaces of greatest extent. The equipment in FIG. 16 realizes this concept, but permits deduction of generalized principles for this heat exchange between food and the steam-air mixture. Here, two points are of particular importance. First, one piece of food to be thawed must be supported somehow in the thawing chamber, and, second, the piece of food should be oriented in relation to inlet and outlet to achieve the desired objective, namely, a fast and uniform thawing in the best possible manner.

The vanes 36 in the thawing chamber must have a rather thin upper edge, so that the area of contact with the piece of food is very small, and very little of the surface of the piece of food is not exposed to the turbulent flow. The flow fans out from the chamber 30 radially outward all along the lower surface 42a except for the small areas covered by the supporting vanes. There is continuously turbulent cross movement due to turbulent mixing transverse to the lower surface 42a of the food removing air depleted with steam from the surface regions and replenishing the surface regions with fresh steam.

A flowing gas will not change its direction of flow unless it is acted upon by a force. Thus, the side walls of the chamber provide a 90° change in the direction of flow with the result that the steam-air mixture flows upwardly along the chamber side walls. A substantial portion of the flow travel to the top of the chamber and then descend in a curvilinear path towards the venting openings 50 of the collector tube 48. The direction of flow will be practically normal to the upper food surface 42b in the area closest to the venting openings 50, since they are the sink for the flow. Thus, this central core of flow around the collector tube 48 has a high velocity and is in effect a turbulent jet directed normal to the surface 42b. The velocity of flow decreases radially and has very low value near the rim portion 42c of the food. This flow pattern is essentially equivalent to turbulent jets positioned above and below the food and directed normal to the top and bottom surfaces of the food. The flow pattern thus has a centroid which is colinear with the food centroid. The temperature distribution has a variance of only a few degrees throughout a homogeneous food. The reason for the uniformity of temperature throughout the food is due to the fact that a distribution of turbulent jets which are positioned above and below the frozen food and with the jet flow directed normal to the top and bottom surfaces of the food will provide a very uniform flow of heat from the food surfaces to the innermost points of the food. However, the rate of flow of heat from the surface to the interior depends also on the diffusivity of the food. The heat flow rate also depends on the thickness of the food. Thus, the ideal food properties for a fast thaw process are a uniform thickness and diffusivity.

The use of the equipment as a home or household appliance places a limitation on the availability of suitable heat sources. The gas range burners have a maximum heat output of 12,000 BTU/hr. and the corresponding electric range elements have a similar heat output. There is a difference in the nature of the heat produced in these two types of heat sources. The electric range element depends primarily on conductive heat transfer, to a lesser extent on radiative heat transfer, and to a small extent on convective transfer. The gas range burner depends almost entirely on convective heat transfer, although there is a small amount of flame radiation. One can see that when the device illustrated is placed on a gas stove that there is a strong convective flow of hot gases upwards along the sides of the boiler, along the bottom of the thawing chamber and upwards along the sidewalls of the thawing chamber. This is very desirable.

The heating process precedes the thawing process as it takes some time for the water in the boiler to heat up sufficiently for developing appreciable quantities of steam. On the other hand, the external convection flow begins to heat the bottom and outer walls of the thawing chamber right from the instant of placing the boiler on the flame. When the first portion of the steam-air mixture enters the thawing chamber and contacts the sidewalls, there will not be too much condensation. It is extremely important to preheat the thawing chamber to a temperature which is higher than the dewpoint of the steam-air mixture. If the thawing chamber was heated solely by the steam-air mixture, a correspondingly larger quantity of water would be required. The larger quantity of water would need a longer time for heating it to the boiling point and, therefore, increase the total time required to thaw the frozen food. Thus, for a home appliance, it is of functional importance to place the thawing chamber above the boiler, so that the outflow of heat in the form of convection from underneath the boiler envelopes the thawing chamber, preheating it and thus reducing heat losses drastically, which, in turn, speeds up the thawing process.

The effect of enveloping the boiler and the thawing chamber with the hot gases range burner is to greatly raise the temperature of the air which enters the ejector. To obviate this situation, an enclosure wall 51 can be provided with at least one opening such as 52 since the ejector inlet 18 requires communication with the environmental air. This opening should be remote from the boiler since the air entering the ejector should not be too warm. The appicance should be usable for electric as well as gas ranges. The air around the device becomes warmer for this latter type of heating source than for the former type. An air admitting opening remote from the boiler and from the heat source thus ensures some uniformity of temperature of the admitted air as the differences in air temperatures for the two types of heating sources will be prevalent in the immediate vicinity of the opening 52 in the enclosure wall 51.

The apparatus shown in FIG. 16, which includes plate 51, will produce a vapor aeriform gas which is saturated provided that the source of heat is a gas burner. Plate 51 is an enclosure which separates the space containing the ejector from the room air, and plate 51 contains one or more openings 52. With this arrangement, the hot burner gases flow by natural convection vertically along the boiler sides and along the outside surfaces of the enclosure 51 and food chamber 44. This vertical flow of hot gases will entrain and mix with the contiguous room air and there will be a continuous decrease in the temperature and velocity of this mixture of hot burner gas and room air. The volume of the mixture will increase accordingly. This flow will be distributed more or less uniformly around the periphery of enclosure 51.

When steam is flowing through the ejector, there will be a flow of gas from the space within the enclosure 51, with a consequent decrease in the enclosure gas pressure. With an opening in the enclosure, there will be a flow of the gases outside the enclosure through the opening 52 since the gas pressure within the enclosure is below atmospheric pressure. The first gases to enter the opening 52 should be the mixture of hot burner gas and air which is contained in the small annular region surrounding the enclosure 51. Subsequently, the gases admitted through the opening 52 would be the mixture of hot gas and air located a short radial distance from the opening 52 and the room air which would flow into the opening along a path colinear with the axis of the opening. Thus, the mixture of gases admitted through the opening would contain a very small quantity of the burner gas if there is only one small opening. The opening 52 must, of course, be large enough so that the ejector suction pressure is not great enough to produce ejector instability with resulting oscillations.

The ideal temperature of the mixture of hot burner gas and air entering opening 52 is the dewpoint of the vapor aeriform gas. Under this condition, the vapor aeriform would not contain any water droplets which appear when the gases entering the ejector inlet are heated to the dewpoint by the condensation of the steam.

The apparatus shown in FIG. 16 which does not contain plate 51 will produce a vapor aeriform gas which is saturated, provided that the source of heat is an electrically heated hot plate. The small quantity of air which is heated by the sheath of the heating element which has a relatively small area is not of sufficient magnitude to heat the room air entering ejector inlet 18 to the dewpoint of the vapor aeriform gas.

The apparatus shown in FIG. 16 which contains a plate 51 will produce an unsaturated or superheated vapor aeriform gas, provided that the source of heat is a gas burner. The enclosure plate 51 extends from the top of the boiler 10 to the bottom of plate 32. The small opening 52 must be changed to an annular opening between the bottom of the enclosure 51 and the top surface of boiler 10. This opening should be about ⅛ inch high and could be obtained by shortening the height of enclosure plate 51 by 150 inch. An alternate arrangement would be to increase the diameter of the enclosure 51 and extend it down to the same plane as the bottom of the boiler 11. The radial distance between the inside surface of the enclosure 51 and the outside surface of boiler 10 should be about ⅛ inch. I have found that very high thermal efficiency can be obtained with this vapor aeriform gas generated when the velocity of the mixture of hot burner gases flowing in the annular space between the inside of the surface of enclosure 51 and the outside surface of the boiler is about 1000 ft/min.

I have a model with a 10 inch diameter boiler, with an ejector having a 7/16 inch throat and an 0.081 inch nozzle. When a gas burner with about 24,000 BTU/hr. is used as a source of heat, the boiler pressure is just under 30 psi. The boiler has an enclosure with an inside diameter of 10¼inch, thereby providing an annular space between the inside of the enclosure and the outside of the boiler of ⅛ inch wide. The enclosure extends ⅜ inch below th bottom of the boiler. The vapor aeriform gas produced by this generator has a temperature of 287° F and a dewpoint of 154° F. During hundreds of tests, the mixture temperature and the dewpoint have never deviated by more than 1° F. The ejector provides a precision control of the temperature and dewpoint of the vapor aeriform gas. In order to raise the mixture temperature and lower the dewpoint, it is necessary to decrease the diameter of the boiler, reduce the diameter of the steam nozzle and increase the diameter of the ejector throat. The smaller area boiler extracts less heat from the gas products, thereby raising their temperature. The smaller diameter nozzle reduces the amount of steam and in conjunction with the larger throat lowers the dewpoint temperature. The larger throat diameter increases the capacity of the ejector so that more air is sucked into the ejector inlet along with the much higher temperature gas products. Once these parameters are chosen, the ejector will provide precision control of the temperature and dewpoint of the vapor aeriform gas.

The apparatus shown in FIG. 16 which does not include plate 51 will produce an unsaturated or superheated vapor aeriform gas, provided that the source of heat is a gas burner.

The boiler 10 containing water is heated by a flow of hot gas products emitted by the gas burner. These gas products flow outward along radially directed paths on the boiler bottom 11. The temperature of the hot gas products after they leave the flame is in the range of 1650° to 1850° F according to the American Gas Association. The boiler 10 with a measured quantity of water can be assumed to be 70° F when the burner is ignited. After burner ignition, the temperature of the boiler and water will increase continuously during the thawing and heating process. After the water reaches the boiling point, the rate of increase of the steam pressure will be commensurate with the rate of heat flow from the boiler bottom 11 to the water. This heat transfer coefficient depends on the density of heat flow from the hot gas products through the boiler bottom 11. The heat transfer coefficient increases rapidly with increasing density of energy glow and will attain a value of 900 BTU/hr/ft/$_2$/° F when the energy density of heat flow is 16,000 BTU/hr/$ft^2$. The temperature of the boiler bottom 11 increases with respect to the water temperature so that with the 16,000 BTU/hr/$ft^2$ energy density, the temperature difference is 18° F. A unique feature of nucleate boiling is the fact that the temperature difference between the boiler bottom 11 and the boiling water will reach a maximum value of 22° F when the energy density of the heat flow through the bottom of the boiler bottom 11 to the boiling water is 40,000 BTU/hr/$ft^2$. During the heating process, a portion of the sensible heat of the gas burner products is transformed adiabatically into both heat and pressure energy which is the product of the steam volume and pressure. I used a pressure of only 2 psi in the boiler of a fast thaw device which was the first. In subsequent models, I have used pressures of 6 psi, 12 psi and 25 psi. The maximum practical steam pressure which can be used has a magnitude whereby the velocity of the steam at the converging type nozzle exit is equal to the velocity of sound in the steam under the conditions of temperature and pressure prevailing. The velocity of sound in the nozzle throat is reached when the steam pressure before transformation to flow velocity is about 22 psi. There is, however, a loss of head in the steam passages where the flow velocity is high which must be added to the critical steam pressure in order to obtain the boiler pressure which must be used. The boiler pressure after steady state operation is obtained should have a minimum value of 25 psi. The temperature of steam with a pressure of 25 psi is about 265° F. The bottom of the boiler 11 would have a temperature which is 18° F higher than the water and steam temperature when the density of heat flow through the boiler bottom 11 has a value of 16,000 BTU/hr/$ft^2$. Thus, the burner gases with a source temperature of 1650° to 1850° F have a sink temperature of 265° F + 18° F = 283° F, which is 213° F higher than the initial sink temperature of 70° F. During this transient process there will be a minimum change of 213° F in the temperature of the heat burner gases when they reach the rim of the boiler bottom. I have never found the temperature of these hot gases at the boiler rim to be below 900° F. These hot gases flow vertically along the boiler sides and then in a curvelinear path to the ejector inlet 18. The hot gases entrain room air during their vertical flow to the ejector inlet and room air will also flow downward to the ejector inlet 18.

In summation, it is established that a superheated vapor aeriform gas can be produced by two arrangements of the apparatus shown in FIG. 16. In the first arrangement, the burner gas products flow from the rim of the boiler bottom in unrestricted paths to the ejector inlet after entraining room air which also enters the ejector inlet. In the alternate arrangement, the burner gas products flow at high velocity between an enclosure and the boiler sides. The thermal efficiency of this latter arrangement is at least 90% or more and is probably the highest thermal efficiency that has been obtained in a gas fired device. During this process a portion of the sensible heat of the gas products is transformed adiabatically into latent and pressure energy of the superheated vapor aeriform gas which is produced by the ejector by mixing steam from the boiler with the cooled gas products and the entrained room air. The ejector controls the temperature and dewpoint of the vapor aeriform gas and forces it over the frozen food in turbulent jet flow.

The inventive method and principal features of the apparatus are also applicable for large scale thawing. Meat may be placed on long thin rails spaced an inch or two apart, and several injecting nozzles as well as exhaust vents are positioned so that again there is a turbulent flow along all sides. Separate injection and exhaust systems can be provided for opposite sides, as it is not essential that the flow from one and the same injection nozzle covers all of the surface, as long as substantially the entire surface is enveloped by turbulent flow or air and steam. The inventive method is also applicable for a continuous process type operation in that food is placed on a belt made of thin strands, and then there are numerous injectors blowing the steam-air mixture towards the food from all sides as it passes along. The speed of the belt can be made adjustable to accommodate differently sized meat, so that the thawing time needed can be regulated by adjusting the total time a piece is subjected to the injectors. Deeply frozen food can thus speedily be prepared for restaurant use.

The use of numerous injectors blowing vapor aeriform at the food from all sides can be simplified to blowing vapor aeriform gas to the top and bottom surfaces of the food when the thickness of the frozen food is relatively small. The injectors could consist of ejectors without the mixing tube and the diffusers, since there would be no loss of head between the injector outlet and the food. The use of many small steam nozzles would not be efficient since the friction losses in the nozzles would vary with the inverse fifth power of the diameter. A more efficient method would be to use a single ejector to produce a primary mixture of steam and hot gases. Thus, the diameters of the injector nozzles would be much larger and the friction losses in the injector nozzles would be nominal. FIGS. 17 and 18 show an oven for incorporating in a domestic gas range for reconstituting four TV dinners. The ejector at the boiler produces a primary mixture of steam and hot gases which is supplied to the injector nozzles. The injector nozzles entrain hot gas and air during the flow of the primary mixture from the injector nozzle to the injector throat. The quantity of gas entrained depends on the ratio of the throat area to the nozzle area and the distance from the nozzle to the throat.

An alternate arrangement for large scale reconstitution of frozen food is to use a single ejector to supply a vapor aeriform gas to numerous apertures located above and below the frozen food. The vapor aeriform gas would flow from the aperture in chamber walls in the form of free turbulent jets which would produce normal and tangential components of flow of the vapor aeriform gas over the frozen food before reaching the chamber outlet. In order to conserve space and increase the thermal efficiency, numerous food chambers would be placed both above and sideways of each other with plenum chambers located between the top and bottom walls of the chambers. The apertures in the chamber walls would emit the turbulent jets of vapor aeriform gas.

FIGS. 17 and 18 illustrate the salient components of a form of apparatus for reconstituting frozen food which can be incorporated in a domestic gas oven. The superheated vapor aeriform gas has a temperature in the range of 350° to 425° F and a dewpoint in the range of 140° to 150° F.

The temperature and dewpoint of the vapor aeriform gas depend on the temperature gradient between the vapor aeriform gas and the food on one hand, and the final food temperature in the case of the dewpoint. The smaller the temperature gradient between the vapor aeriform gas when the food reaches its final temperature the lower the temperature of the vapor aeriform gas. The food must be heated to a temperature which does not cause discoloration of the food. The dewpoint is chosen so that when the food reaches its final temperature all of the condensate has been removed by vaporization. If, on the other hand, the dewpoint which is selected is too low, the food will lose an excessive quantity of moisture by vaporization. With the form of the apparatus shown in FIGS. 17 and 18, four TV dinners can be reconstituted in less than 10 minutes starting with a cold oven. The superheated vapor aeriform gas is produced by mixing steam with the gas products from a gas burner and with air.

A jet of fuel gas emanates from spud 201 which is mounted on a safety pilot control valve 200. The jet of gas entrains air on its way to the target 202 which is supported by the steam boiler 203. The impingement of the primary mixture of gas and air on the target results in a 90° change in direction of the primary mixture. The primary mixture entrains secondary air in its radial flow and the flame covers all of the target except for a dead spot in the exact center of the target. The diameter of the target is important because the quantity of heat transmitted to the bottom of the boiler 203 is proportional to the area between the outside diameter of the target and the rim of the boiler bottom 203a. The water in the boiler 203 is added by removing the cover 205 of the fill-tube 204. Steam from the boiler 203 discharges through nozzle 206a, of the ejector 206 and the gas products and air enter the bell-mouthed inlet 206b. The ejector 206 mixes the steam, gas products and air in the mixing tube and then transforms a part of the velocity head of the mixture in the diffuser to static pressure. The gaseous mixture then enters injector plenum 207 where it is distributed to the four injector plenums 208. The gaseous mixture then discharges from injector nozzles 209 located in injector plenum 208 and then entrains the partially cooled gas products and air during its flow from the nozzle 209 to the throat 211 at injector plate 210. The vapor aeriform gas which emanates from the injector nozzles 211 in the form of free turbulent jets impinge on the bottom of the frozen food containers and then flow up the sides of the containers to the deflector 213. The vapor aeriform gas then flows towards the discharge opening 215. The vapor aeriform gas then flows downward to the food surface along the deflectors 214 and then is discharged through openings 215. The gas flow on the food surfaces has both normal and tangential components.

A representative design for this oven is as follows: The gas burner spud is size 31 DMS which supplies 26.5 CFH of natural gas with a gas pressure of 4.1 inches w.c. The heat output is thus 28,000 BTU/hr. The target diameter is 4.17 inches with a boiler diameter of 10 inches. The boiler nozzle diameter is 0.076 inches with the result that the boiler steam pressure is 24.3 psi. The distance between the throat of injector nozzle 209 and the throat of injector plate 210 is 1.12 inches. The distance between a TV dinner and the injector throat 210 is ⅞ inches. The vapor aeriform gas emanating from the injector plate throat 210 has a temperature of 428° F and a dewpoint of 145° F. The four TV dinners were heated to a uniform temperature of about 180° F in a period of 9 minutes starting with a cold oven. The pre-heat time to 450° F for a conventional oven varies from 10 to 15 minutes. Thus, the vapor aeriform gas oven has the speed of five times the speed of a conventional oven.

FIG. 19 illustrates the salient components of a form of apparatus for the large scale reconstitution of frozen food. The superheated vapor aeriform gas has a temperature in the range of 350° to 450° F and a dewpoint in the range of 140° to 150° F. The superheated vapor aeriform gas is produced by mixing steam with the gas products from a gas burner and with air. Air enters centrifugal blower wheel 103 after passing through an air filter 101 and openings 102. The blower wheel is mounted directly on the shaft of motor 100. This air will remove heat from the motor and blower wheel. Air also enters the device through openings 115 and 116. Part of the air entering is for burner 113. The burner gas products flow inside the atmospheric boiler 114 and enter the plenum 112a. The air entering opening 116 is mixed with steam from the outside surface of the boiler 114 and with the jets of vapor aeriform gas leaving the apertures 111. The water which is distributed by openings in pipes 117 flows down the high temperature surfaces of boiler 114 where it is rapidly changed into steam. The jets from apertures 111 are effective in mixing the steam and air with the vapor aeriform gas. The mixture of steam, air, and aeriform gas enters plenum 112a, along with the hot burner gases which have lost a portion of their sensible heat content by the adiabatic vaporization of the water. The mixture of these four gases will flow along the plenum 112a to the blower inlet 112 which is located at the midpoint of the plenum 112a. The four gases entering the blower inlet 112 are premixed in the blower wheel with the outside air which entered openings 102 and then thoroughly mixed after passing through the blower wheel blades. A centrifugal blower wheel is the most effective known method of mixing two or more gases. The venturi mixer is the second most effective method. The high velocity discharge from the backward curved blower with its rotational component must be transformed into a uniform static pressure in order to provide a uniform flow of vapor aeriform through the two-dimensional jet 105. This is accomplished by providing a large plenum chamber 104. The gases leaving the jets 105 flow down the outside wall of chamber 106 and then return vertically along the inside wall of 106 where they enter the horizontal plenums 108. The vapor aeriform gases leave the plenums 108 through apertures 108a, thereby creating turbulent jets. The number of apertures in the top and bottom walls of the food chambers 109 range from 12 to 15 apertures for each wall for each food portion such as a TV dinner. The large commercial trays would, of course, require several times the number of apertures which are used on the small food portions.

The amazing superiority of this new convective system is partly due to the fact that the heat transfer depends to a major degree on the jet impingement and not on the slow flow of the cooled vapor aeriform gases which flow tangentially between the jets to the outlet apertures 111 and then into chamber 110. This unique process means that every food portion in the oven regardless of location will be treated by vapor aeriform gases with identical temperatures and dewpoints. In all prior art ovens the hot gases flow horizontally over the food portions in a series distribution so that the first food portion is heated to the highest temperature and the last food portion has a much lower temperature. The upstream food portion is overheated and the temperature in the center of the food portion can be 50° F lower than the upstream region, and the downstream region of the food portion will have an intermediate temperature. My new convection system will provide total temperature variances of 5° to 7° F throughout the entire food volume.

The stack outlet 118 has a damper for controlling the volume of effluent which thereby will control the amount of air entering through openings 102 and 115. The water flow to the atmospheric boiler 114 was controlled by an orifice and a pressure regulator. FIG. 14 shows the quantity of air and water required to control the temperature and dewpoint of the vapor aeriform gas. A timer could be used to operate a circuit breaker which would control the operation of the motor, the solenoid valve in the water line, and the solenoid valve in the gas line.

A commercial oven for reconstituting frozen food using a vapor aeriform gas in a form of the apparatus as shown in FIG. 19 will reconstitute a TV dinner in 6 minutes, which is approximately one-fourth the time required by the forced convection hot air ovens now in use and the food quality is far superior.

While I have described a preferred embodiment of the invention in considerable detail for purpose of illustration, it should be understood that the invention is restricted to specific details which I have shown.

It will be apparent to those skilled in the art that many other embodiments, various changes and modifications may be made without exceeding the scope of the invention as defined by the following claims, wherefore, what I claim as my invention is:

1. Apparatus for reconstituting frozen food comprising:
   a convective source of hot burner gases;
   chamber means for supporting frozen foods;
   guidance means positioned in the walls of the chamber means for directing the flow of the hot burner gases over the frozen food supported in the chamber means;
   boiler means for adiabatically transforming a large portion of the sensible heat in the hot burner gases into the latent heat of steam;
   means for homogeneously intermixing external to the chamber means, the steam with air and the hot burner gases which have lost a portion of their sensible heat; and
   means for forcing the homogeneous mixture to flow turbulently with said guidance means towards the top and bottom surfaces of the frozen food supported in the chamber means.

2. Apparatus for reconstituting frozen food comprising:
   means for producing hot gases;
   aperture means in the top and bottom walls of a chamber means;
   means for preheating the chamber means with the hot gases;
   means for vaporizing water;
   means for controlling the quantity of water vaporized;
   means for homogeneously intermixing the water vapor with the hot gases so that the homogeneous mixture has a mixture temperature which is substantially higher than the mixture dewpoint; and
   means for forcing the homogeneous mixture to flow into the aperture means in order to create turbulent jets directed to flow normal to the top and bottom surfaces of the frozen food supported in the chamber means.

3. Apparatus for reconstituting frozen food comprising:
   boiler means containing water heated by hot burner gases to generate steam by adiabatically transforming a large portion of the sensible heat of the hot burner gases into the latent heat of steam;
   guidance means positioned in the walls of a chamber means for supporting frozen food;
   means for producing a homogeneous mixture of steam with air and hot burner gases whereby the temperature of the homogeneous mixture is substantially higher than the mixture dewpoint; and
   means for forcing the homogeneous mixture to flow turbulently with said guidance means, towards the top and bottom surfaces of the frozen food supported in the chamber means.

4. Apparatus for reconstituting frozen food comprising:
   means for heating air;
   means for vaporizing water;
   chamber means for supporting frozen food;
   guidance means positioned in the walls of the chamber means;
   means for preheating the chamber means with the hot air before the frozen food is placed in the chamber means;
   means for homogeneously intermixing the water vapor with the hot air so that the mixture temperature is substantially higher than the mixture dewpoint; and
   means for forcing the homogeneous mixture to flow turbulently with said guidance means towards the top and bottom surfaces of the frozen food supported in the chamber means.

5. Apparatus for reconstituting frozen food comprising:
   aperture means in the top and bottom walls of a chamber means;
   means for producing a homogeneous mixture of water vapor and hot air whereby the temperature of the homogeneous mixture is substantially higher than the mixture dewpoint; and
   means for forcing the homogeneous mixture to flow into the aperture means in order to create turbulent jets directed to flow normal to the top and bottom surfaces of frozen food supported in the chamber means.

6. Apparatus for reconstituting frozen food comprising:
   a source of hot burner gases;
   means for inducing a flow of air;
   means for supplying a flow of water;
   means for transforming adiabatically a large portion of the sensible heat of the hot burner gases into the latent heat of water vapor;
   aperture means in the top and bottom walls of a chamber means;
   means for homogeneously intermixing external to the chamber means the water vapor, air and substantially cooled burner gases.
   means for controlling the rates of flow of the water and air, in order to produce a vapor aeriform gas with a predetermined temperature and dewpoint; and
   means for forcing the vapor aeriform gas to flow into the aperture means in order to create turbulent jets directed to flow normal to the top and bottom surfaces of the frozen food supported in the chamber means.

7. Apparatus for reconstituting frozen food comprising:
   means for convecting hot air;
   chamber means vented to the atmosphere for supporting frozen food;
   means for preheating the chamber means with the hot air from said convecting means before the frozen food is placed in the chamber means;
   means for vaporizing water after the frozen food is placed in the chamber means;
   means for homogeneously intermixing the water vapor with the hot air in order to produce a vapor aeriform gas with a temperature substantially higher than its dewpoint;
   means for heating the frozen food to a temperature corresponding to the dewpoint of the vapor aeriform gas by forcing the vapor aeriform gas to flow turbulently over substantially the entire surface of the food, thereby causing a concomitant deposition of vapor condensate on the food surface; and
   means for controlling the quantity of water vapor in the vapor aeriform gas so that when the food temperature attains the desired final temperature, all of the condensate will have evaporated.

8. Apparatus for reconstituting frozen food comprising:
   means for producing hot gas;
   means for producing water vapor;
   means for homogeneously intermixing the water vapor with the hot gas so that the temperature of the homogeneous mixture is substantially higher than the mixture dewpoint;
   guidance means in the walls of a chamber means for supporting frozen food; and
   means for forcing the homogeneous mixture of water vapor and hot gas to flow turbulently with said guidance means towards the top and bottom surfaces of the frozen food supported in the chamber means.

9. Apparatus for reconstituting frozen food comprising:
   means for producing a hot gas;
   means for vaporizing water by heat transfer from the hot gas to the water;
   aperture means in the walls of a chamber means; and blower means for homogeneously mixing the water vapor with the hot gas external to the chamber means after the hot gas has lost a portion of its sensible heat and whereby the blower means forces the homogeneous mixture to flow into the aperture means in order to create turbulent jets directed to flow normal to the top and bottom surfaces of the frozen food supported in the chamber means.

10. Apparatus for reconstituting frozen food comprising:

means for convecting hot air;

a source of water;

aperture means in the top and bottom walls of a chamber means vented to the atmosphere;

means for preheating the chamber means with the hot air from said convecting means before the frozen food is placed in the chamber means;

means for vaporizing said water after the frozen food is placed in the chamber means;

means for homogeneously intermixing the water vapor with the hot air in order to produce a vapor aeriform gas with a temperature substantially higher than its dewpoint; and means for forcing the homogeneous mixture to flow into aperture means in order to create turbulent jets directed to flow normal to the top and bottom surfaces of frozen food supported in the chamber means.

* * * * *